United States Patent
Matsuo

(10) Patent No.: US 9,438,088 B2
(45) Date of Patent: Sep. 6, 2016

(54) ROTATING ELECTRICAL MACHINE UNIT WITH A POWER INVERTER HAVING A RING-SHAPED CASING

(75) Inventor: Takeshi Matsuo, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 496 days.

(21) Appl. No.: 13/994,171

(22) PCT Filed: Jan. 12, 2012

(86) PCT No.: PCT/JP2012/050449
§ 371 (c)(1),
(2), (4) Date: Jun. 14, 2013

(87) PCT Pub. No.: WO2012/096335
PCT Pub. Date: Jul. 19, 2012

(65) Prior Publication Data
US 2013/0278090 A1    Oct. 24, 2013

(30) Foreign Application Priority Data

Jan. 12, 2011  (JP) .................................. 2011-003873

(51) Int. Cl.
*H02K 5/20* (2006.01)
*H02K 9/19* (2006.01)
(Continued)

(52) U.S. Cl.
CPC ........... *H02K 9/19* (2013.01); *H02K 5/20* (2013.01); *H02K 9/193* (2013.01); *H02K 11/33* (2016.01)

(58) Field of Classification Search
CPC ............ H02K 9/00; H02K 9/19; H02K 5/20; H02K 9/193; H02K 11/33; H02M 7/42; H02M 7/44; H02M 7/48; H02M 7/4822; H02M 7/493

USPC ... 310/52, 54, 58, 59, 68 D, 68 R, 159, 161, 310/216.119
See application file for complete search history.

(56) References Cited

U.S. PATENT DOCUMENTS 5,925,947 A * 7/1999 Kajiwara ................. H02K 9/18
                                                                310/58
6,488,475 B2 * 12/2002 Murata ..................... A47L 5/22
                                                                417/32

(Continued)

FOREIGN PATENT DOCUMENTS

JP   7-298552 A      11/1995
JP   2004-297847 A   10/2004

(Continued)

OTHER PUBLICATIONS

International Search Report dated Mar. 27, 2013 with English translation (Three (3) pages).

*Primary Examiner* — Quyen Leung
*Assistant Examiner* — Minki Chang
(74) *Attorney, Agent, or Firm* — Crowell & Moring LLP

(57) ABSTRACT

A rotating electrical machine unit includes a rotating electrical machine including a ring-shaped stator and a rotator provided inside of the stator, and a power inverter including a ring-shaped first casing and a power module accommodated in the first casing and integrated with the rotating electrical machine by being stacked in such a manner that a lower surface of the first casing is in contact with an upper surface of the stator. The power inverter has a first coolant path formed to have a ring shape in the first casing. The power module has a heat radiation unit arranged in the first coolant path and exchanging heat with a cooling medium flowing in the first coolant path.

17 Claims, 17 Drawing Sheets

(51) Int. Cl.
*H02K 9/193* (2006.01)
*H02K 11/00* (2016.01)

(56) References Cited

U.S. PATENT DOCUMENTS

2007/0284954 A1* 12/2007 Lin .................... H02K 11/0073
 310/58

2009/0231811 A1* 9/2009 Tokuyama .............. H01L 23/36
 361/699
2011/0101804 A1* 5/2011 Isoda .................... H02K 11/048
 310/64

FOREIGN PATENT DOCUMENTS

JP 2007-335530 A 12/2007
JP 2009-88466 A 4/2009

* cited by examiner

ROTATING ELECTRICAL MACHINE UNIT WITH A POWER INVERTER HAVING A RING-SHAPED CASING

TECHNICAL FIELD

The present invention relates to a rotating electrical machine unit having a rotating electrical machine and a power inverter which are integrally formed.

BACKGROUND ART

A rotating electrical machine, the entire device of which is downsized by integrating a rotating electrical machine and a power inverter, is known. PTL 1 suggests a rotating electrical machine unit having a cooling unit between a rotating electrical machine and a power inverter for cooling both of the rotating electrical machine and the power inverter.

CITATION LIST

Patent Literature

PTL 1: Japanese Patent Application Laid-Open No. 2009-88466

SUMMARY OF INVENTION

Technical Problem

A compact rotating electrical machine unit having a high cooling performance, which can be installed on a vehicle easily, has been desired with the reduction of the size of the rotating electrical machine unit and the increase of the output of the rotating electrical machine unit.

Solution to Problem

According to a first aspect of the present invention, a rotating electrical machine unit includes: a rotating electrical machine including a ring-shaped stator and a rotor provided inside of the stator; and a power inverter including a ring-shaped first casing and a power module accommodated in the first casing, and integrated with the rotating electrical machine by being stacked in such a manner that a lower surface of the first casing is in contact with an upper surface of the stator, wherein the power inverter has a first coolant path formed to have a ring shape in the first casing, and the power module has a heat radiation unit arranged in the first coolant path and exchanging heat with a cooling medium flowing in the first coolant path.

According to a second aspect of the present invention, it is preferable that the first coolant path be formed in such a manner that a first space concavely formed to have a ring shape from the lower surface of the first casing is closed by the upper surface of the stator.

According to a third aspect of the present invention, it is preferable that the rotating electrical machine be an alternating current rotating electrical machine driven by a three-phase alternating current power, and includes an inverter circuit for converting a direct current power into an alternating current power, and the inverter circuit has first to third power modules provided for each phase, the first to third power modules are provided by connecting a pair of transistors of upper and lower arm circuits in series, the heat radiation unit has first and second radiation surfaces radiating heat from the pair of transistors, and the heat radiation unit is configured such that each of the first and second radiation surface is inserted into the first coolant path to face inner and outer peripheries of the first coolant path formed in the ring shape.

According to a fourth aspect of the present invention, it is preferable that, on the first and second radiation surfaces of the heat radiation unit of the first to third power modules, a plurality of heat radiation fins be vertically provided to protrude to the coolant path.

According to a fifth aspect of the present invention, each of the first to third power modules has a metal case having a rectangular parallelepiped shape, and surfaces of two side plates arranged to face each other in the metal case having the rectangular parallelepiped shape are the first and second radiation surfaces, respectively.

According to a sixth aspect of the present invention, it is preferable that the first power module be arranged near an inlet of the coolant path of the power inverter, and the second power module is arranged at an interval of a predetermined angle from the first power module around a center axis in an axial direction of the rotator along flow of the cooling medium introduced from the inlet of the coolant path, and the third power module is arranged at an interval of a predetermined angle from the second power module around a center axis in the axial direction of the rotator along the flow of the cooling medium.

According to a seventh aspect of the present invention, it is preferable that the rotating electrical machine unit include: a bearing that rotatably holds the ring-shaped second casing and the rotator; and a rotator holding unit integrally formed with the rotating electrical machine by being stacked in such a manner that the lower surface of the stator is in contact with the upper surface of the second casing.

According to an eighth aspect of the present invention, it is preferable that the rotator holding unit include a second coolant path formed to have a ring shape in the second casing.

According to a ninth aspect of the present invention, it is preferable that the second coolant path be formed in such a manner that a second space concavely formed to have a ring shape from the upper surface of the second casing is closed by the lower surface of the stator.

According to the tenth aspect of the present invention, it is preferable that the stator include a rib extending to an outer side, and a penetrating hole allowing communication between the first coolant path of the power inverter and the second coolant path of the rotator holding unit is provided as a communication flow channel in the rib.

Advantageous Effects of Invention

According to the invention, a compact rotating electrical machine unit having a high cooling performance, which can be installed on a vehicle easily, can be provided.

DESCRIPTION OF EMBODIMENTS

Hereinafter, an embodiment of a rotating electrical machine unit according to the present invention will be explained with reference to the drawings.

A rotating electrical machine unit according to the present embodiment is a rotating electrical machine unit suitable to be used for travel of a vehicle. Here, a so-called electric vehicle using a rotating electrical machine unit includes a hybrid electric vehicle (HEV) having both of an engine and a rotating electrical machine unit and a pure electric vehicle (EV) which runs only with a rotating electrical machine unit without using any engine. However the rotating electrical machine unit explained below can be used for both of the above-described types, and therefore, the explanation will be made based on the rotating electrical machine unit used for the hybrid electric vehicle which represents both of the types.

First Embodiment

Figure 1:
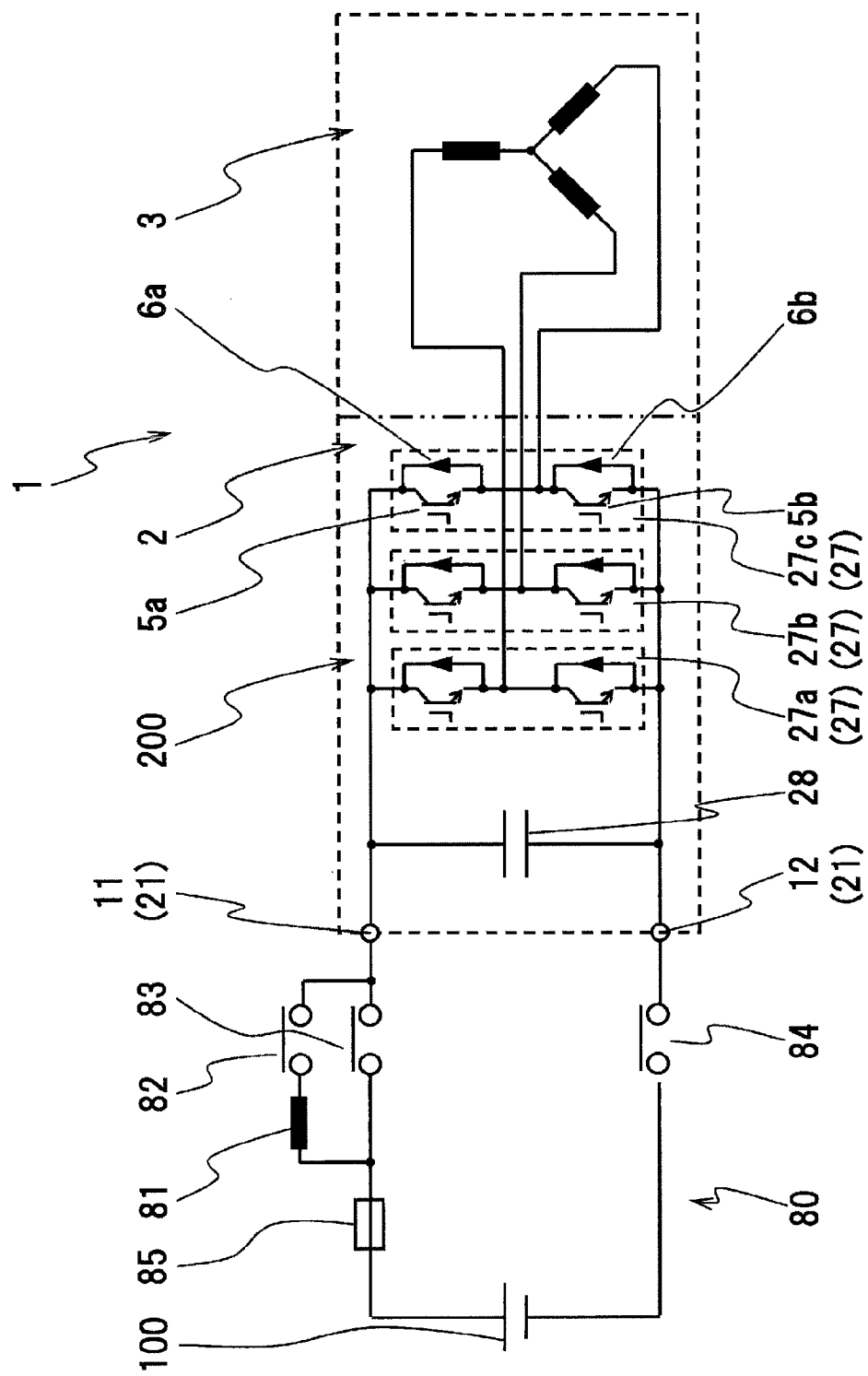
FIG. 1 is a diagram illustrating a configuration of a main circuit of a rotating electrical machine unit according to a first embodiment of the present invention.

As illustrated in FIG. 1, the rotating electrical machine unit 1 according to the first embodiment includes a power inverter 2 having an inverter circuit 200 and an alternating current rotating electrical machine 3 driven with three-phase alternating current power. The rotating electrical machine unit 1 is connected to a battery 100 on the side close to a vehicle via a relay circuit 80.

The engine and rotating electrical machine 3 of the vehicle (not illustrated) generates torque for travel of the vehicle. The rotating electrical machine 3 has a function of not only generating the rotating torque but also converting a mechanical energy applied from the outside to the rotating electrical machine 3 into electric power.

The output torque of the engine is transmitted to the rotating electrical machine 3, and the rotating torque generated by the rotating electrical machine 3 is transmitted to wheels via transmission and differential gears (not illustrated).

On the other hand, during driving with regenerative braking, the rotating electrical machine 3 is rotated by the rotating torque transmitted from the wheels and alternating current power is generated. As explained later, the generated alternating current power is converted by the power inverter 2 into direct current power to charge the high voltage battery 100. The charged electric power is used as driving energy again.

As illustrated in FIG. 1, the relay circuit 80 includes a precharge resistor 81, a precharge relay 82, a positive-side main relay 83, a negative-side main relay 84, and a fuse 85. The relay circuit 80 has a function of changing the on/off state between the circuits of the battery 100 and the power inverter 2 and auxiliary charging (precharging) for preventing inrush current when the inverter is activated.

[Circuit Configuration of Power Inverter]

As illustrated in FIG. 1, the power inverter 2 includes a three-phase inverter circuit 200 and a smoothing capacitor 28. The inverter circuit 200 is electrically connected to the battery 100 via the direct current connectors 11, 12 (21) and the relay circuit 80, so that electric power is exchanged between the battery 100 and the inverter circuit 200.

When the rotating electrical machine 3 is operated as an electric motor, the direct current power provided from the battery 100 via the direct current connectors 11, 12 (21) is converted by the inverter circuit 200 into alternating current power, which is provided to the rotating electrical machine 3. The rotating electrical machine unit 1 causes the rotating electrical machine 3 to operate as an electric motor with the electric power provided from the battery 100, so that the vehicle can be driven with only the power of the rotating electrical machine 3.

It should be noted that the rotating electrical machine unit 1 causes the rotating electrical machine 3 to operate as a power generator with the power provided by the engine or the power provided by the wheel to generate electric power, thereby charging the battery 100.

The inverter circuit 200 has six insulated gate bipolar transistors as a switching semiconductor device. Hereinafter, the insulated gate bipolar transistor will be abbreviated as IGBT.

The inverter circuit 200 has a series circuit of upper and lower arms structured for each phase of three IGBTs 5a and a flywheel diode 6a at a positive side (upper arm side) and three IGBTs 5b and a flywheel diode 6b at a negative side (lower arm side).

In the inverter circuit 200, first to third power modules 27a, 27b, 27c integrated with a series circuit of upper and lower arms, which are called "2 in 1", are provided in association with three phases, i.e., U-phase, V-phase, and W-phase. More specifically, the power inverter 2 has one power module 27 per phase, and each power module 27 is structured by connecting, in series, a pair of transistors of the upper and lower arm circuits.

A smoothing capacitor 28 is electrically connected in parallel between the direct current positive side and the direct current negative side of the power inverter 2. The smoothing capacitor 28 is an electrolytic capacitor or a film capacitor, and is provided to suppress ripples of voltage/current caused by high-speed switching (on/off) operation of the switching semiconductor device.

Further, the power inverter 2 includes a control circuit, a driver circuit, and a signal connector (not illustrated). The signal connector receives a command from the control device at the vehicle side, or transmits data indicating the state of the rotating electrical machine unit 1 to the control device at the vehicle side. The control circuit calculates the amount of control of the rotating electrical machine 3 on the basis of the command which is input from the signal connector and further calculates as to whether operation is done as the electric motor or as the power generator so as to generate a control pulse on the basis of the calculation result and provide the control pulse to the driver circuit. The driver circuit generates a driving pulse for controlling the inverter circuit 200 on the basis of the provided control pulse.

[Structure of Rotating Electrical Machine Unit]

Figure 2:
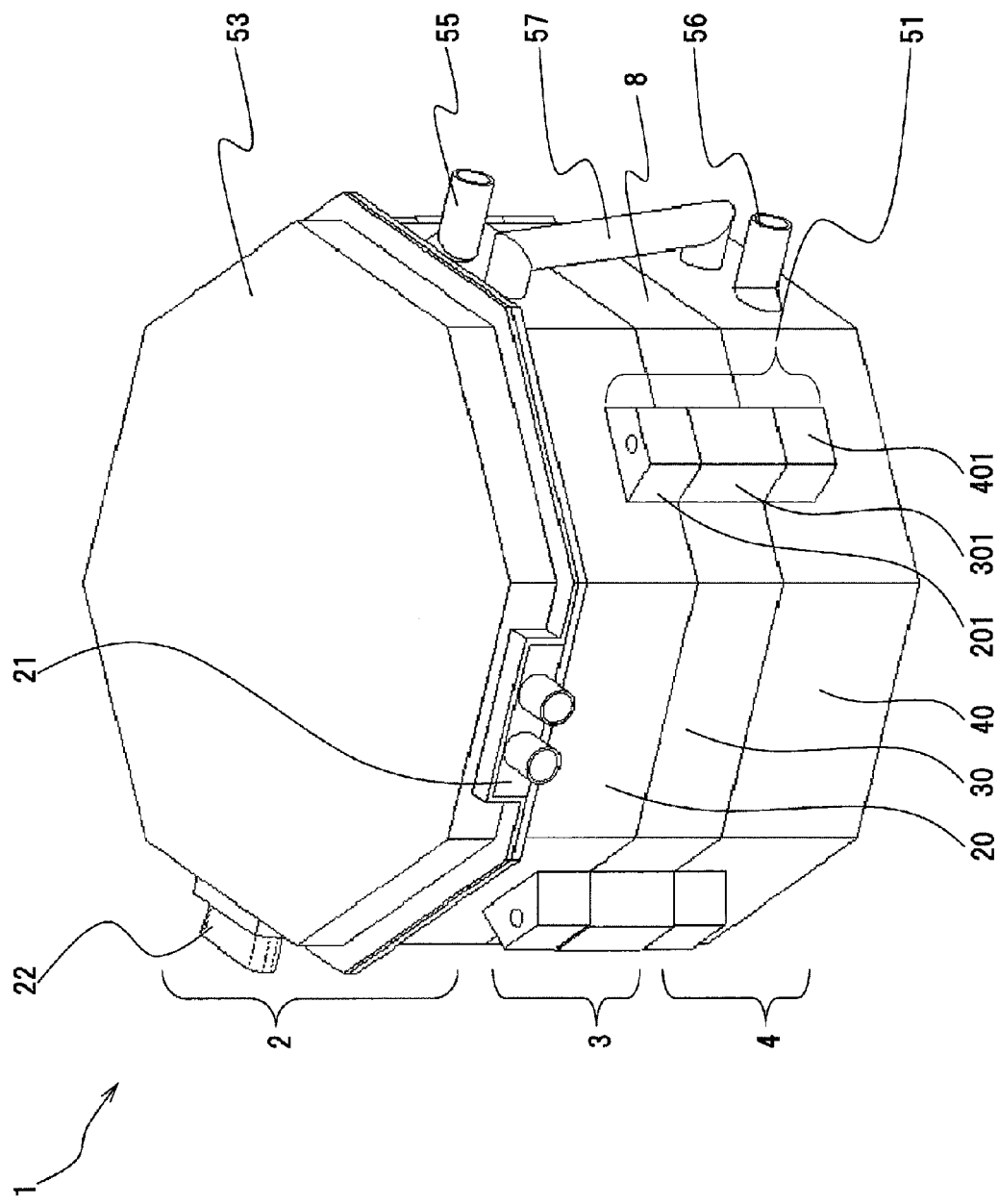
FIG. 2 is an external perspective view illustrating the rotating electrical machine unit according to the first embodiment of the present invention.
Figure 3:
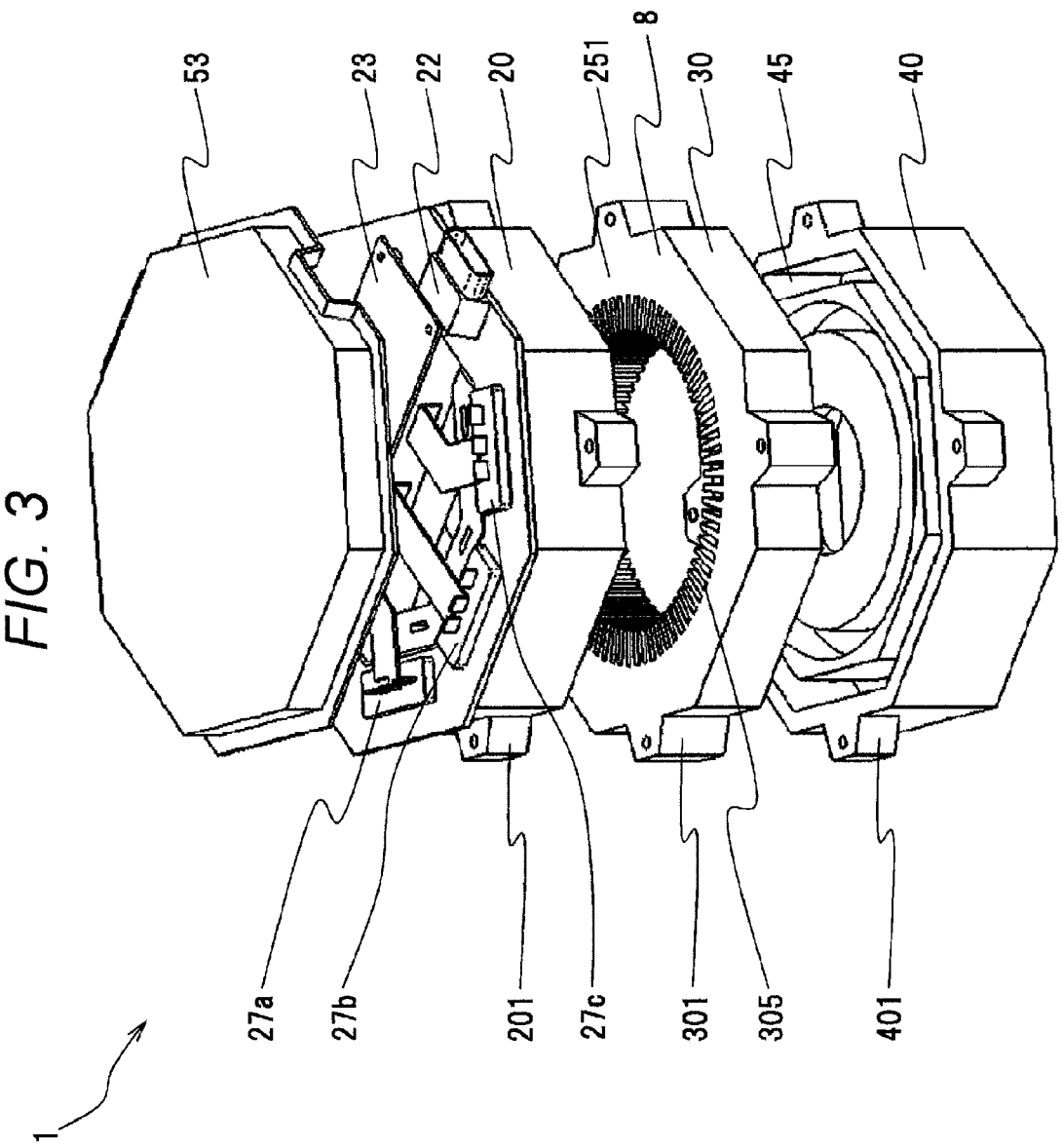
FIG. 3 is an exploded perspective view illustrating the rotating electrical machine unit according to the first embodiment of the present invention.
Figure 4:
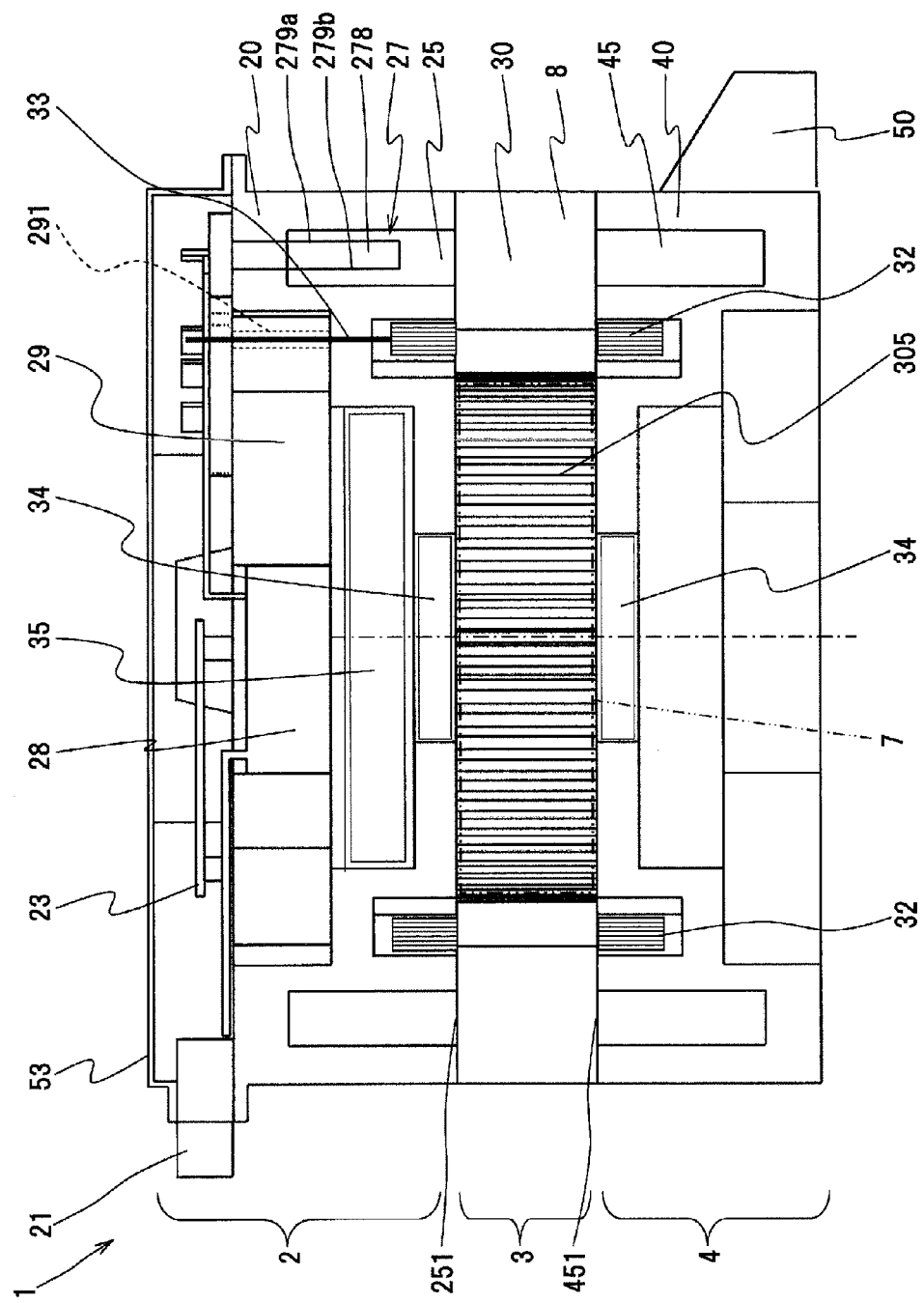
FIG. 4 is a cross-sectional view of a side surface of the rotating electrical machine unit according to the first embodiment of the present invention.
Figure 5:
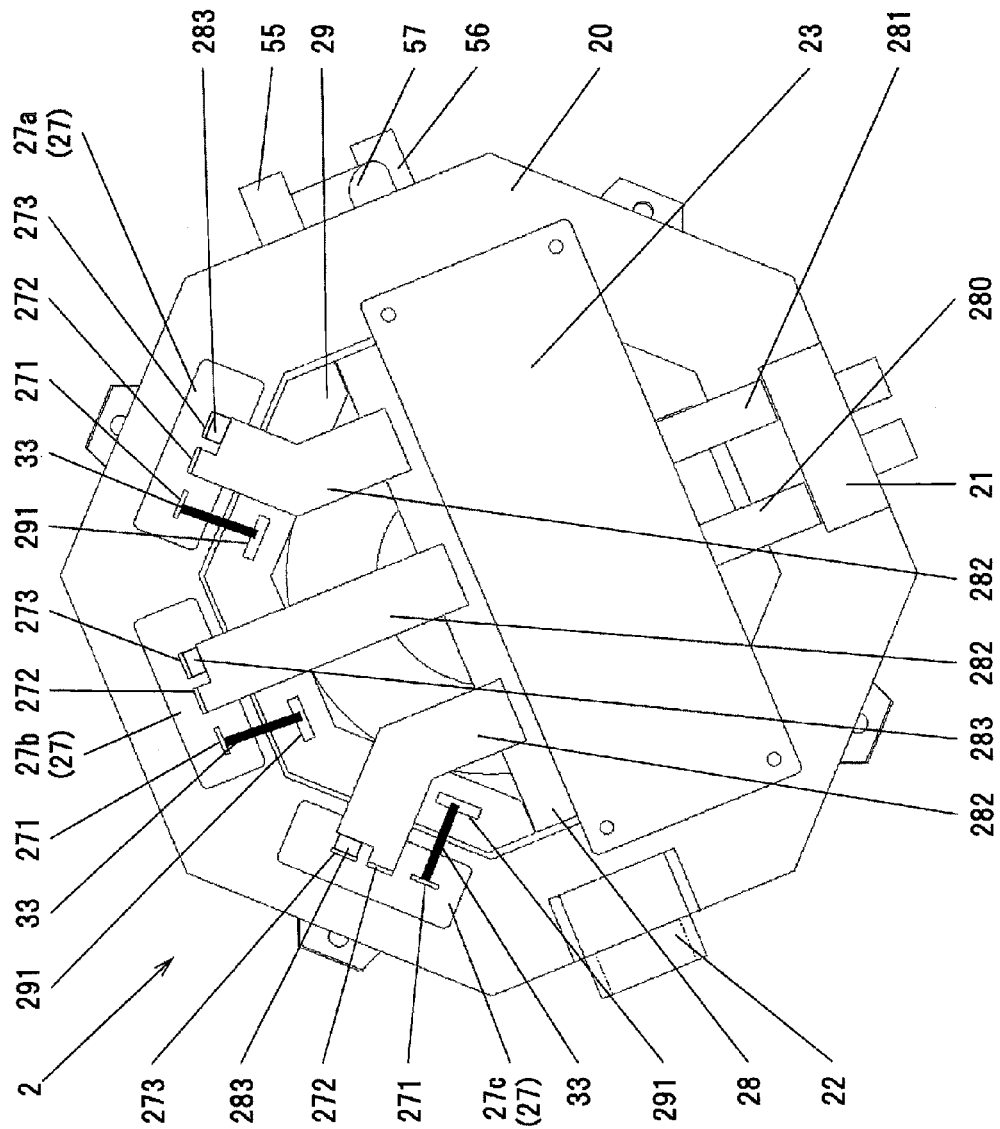
FIG. 5 is a plan view illustrating the rotating electrical machine unit according to the first embodiment of the present invention when a top cover of a power inverter is removed.

The structure of the rotating electrical machine unit 1 will be explained with reference to FIGS. 2 to 5. FIG. 2 is an external perspective view illustrating the rotating electrical machine unit 1. FIG. 3 is an exploded perspective view illustrating the rotating electrical machine unit 1. FIG. 4 is a cross-sectional view illustrating a side surface of the rotating electrical machine unit 1. FIG. 5 is a plan view illustrating the power inverter 2 when a top cover 53 is removed. In order to avoid complexity, a rotator, a stator coil, and insulating paper are omitted in FIG. 3. In FIG. 4, the insulating paper is omitted, and the rotator 7 is illustrated with a two-dot chain line.

As illustrated in FIG. 2, the rotating electrical machine unit 1 includes a power inverter 2, a rotating electrical machine 3, and a rotator holding unit 4. The peripheries of the power inverter 2, the rotating electrical machine 3, and the rotator holding unit 4 have octagonal shapes, and have ribs 201, 301, 401 formed with an interval of 90 degrees in the peripheral direction. The power inverter 2, the rotating electrical machine 3, and the rotator holding unit 4 are integrated with each other by being configured such that the ribs 201, 301, 401 are aligned as a rib group 51 and are fastened with a through bolt (not illustrated). The power inverter 2 and the rotator holding unit 4 are formed in an external shape corresponding to the external shape of the rotating electrical machine 3.

[Structure of Rotating Electrical Machine]

As illustrated in FIG. 2, the rotating electrical machine 3 is sandwiched between the power inverter 2 and the rotator holding unit 4. As illustrated in FIG. 4, the rotating electrical machine 3 includes a stator 8 having a ring-shaped stator core 30 and a stator coil 32 and a rotator 7 provided in the ring-shaped stator core 30 in a rotatable manner.

The stator core 30 is provided by stacking several hundred silicon steel plates of which thickness is about 0.05 to 1.0 mm. As illustrated in FIG. 3, the stator core 30 has 72 slots 305 formed at a regular interval in a peripheral direction in parallel to the direction of the rotation central axis (see FIG. 4) of the rotator 7. Each slot 305 accommodates the stator coil 32.

Although not illustrated, the rotator 7 has a rotator core and a plurality of permanent magnets. The rotator core is provided with 12 magnet insertion holes at a regular interval in a circumferential direction. A permanent magnet, which is magnetized so that the magnetization direction thereof changes alternately for each adjacent magnetic pole, is attached to each magnet insertion hole.

[Structure Of Power Inverter]

As illustrated in FIGS. 2 to 4, the power inverter 2 is attached to the side at an end of the rotating electrical machine 3 in an axial direction. The power inverter 2 includes a ring-shaped inverter case 20. The inverter case 20 is arranged such that the lower surface of the case is in contact with the upper surface of the stator core 30. More specifically, the power inverter 2 is stacked on the rotating electrical machine 3 and is integrated with the rotating electrical machine 3 in such a manner that the upper surface of the stator 8 is in contact with the lower surface of the inverter case 20. The inverter circuit having the first to third power modules 27a, 27b, 27c and the smoothing capacitor 28 as illustrated in FIG. 1 are respectively held in the inverter case 20, and the inverter case 20 is covered with a top cover 53. As illustrated in FIGS. 2 to 4, the top cover 53 is fixed to the inverter case 20 by a plurality of bolts so as to cover the side opposite to the side where the rotating electrical machine 3 of the inverter case 20 is arranged.

Further, as illustrated in FIGS. 4 and 5, a power connector 21 connected with a direct current circuit of the battery mounted on the vehicle and a signal connector 22 used to exchange various kinds of signals between the power inverter 2 and the vehicle side control device (see FIG. 5) are provided on the periphery of the inverter case 20. As illustrated in FIG. 5, in the inverter case 20, a control circuit board 23 is provided over the inverter case 20 having an octagonal shape in planar view, and input bus bars 280, 281 connect the smoothing capacitor 28 and the power connector 21 accommodated within the inverter case 20. The inverter case 20 is provided with output bus bars 282, 283 electrically connecting the smoothing capacitor 28 and each power module 27, a current sensor 29, and a resolver 35 (see FIG. 4).

The direct current from the battery 100 is input to the power inverter 2 via the power connector 21, and the ripple component is smoothed by the smoothing capacitor 28, so as to be supplied via the output bus bars 282, 283 to a positive-side direct current terminal 272 and a negative-side direct current terminal 273 of the power module 27.

The three power modules 27 are switched, whereby the input direct current power is converted into alternating current power so as to be sent from an alternating current terminal 271 of each of the first to third power modules 27a, 27b, 27c to the rotating electrical machine 3 via a lead wire 33 of the stator coil 32 connected to each alternating current terminal 271. The lead wires 33 extending from the end portion of the stator coil 32 passes through a penetrating opening 291 of the current sensor 29 and is connected to the alternating current terminal 271 of each of the power modules 27a, 27b, 27c of the power inverter 2.

Figure 6:
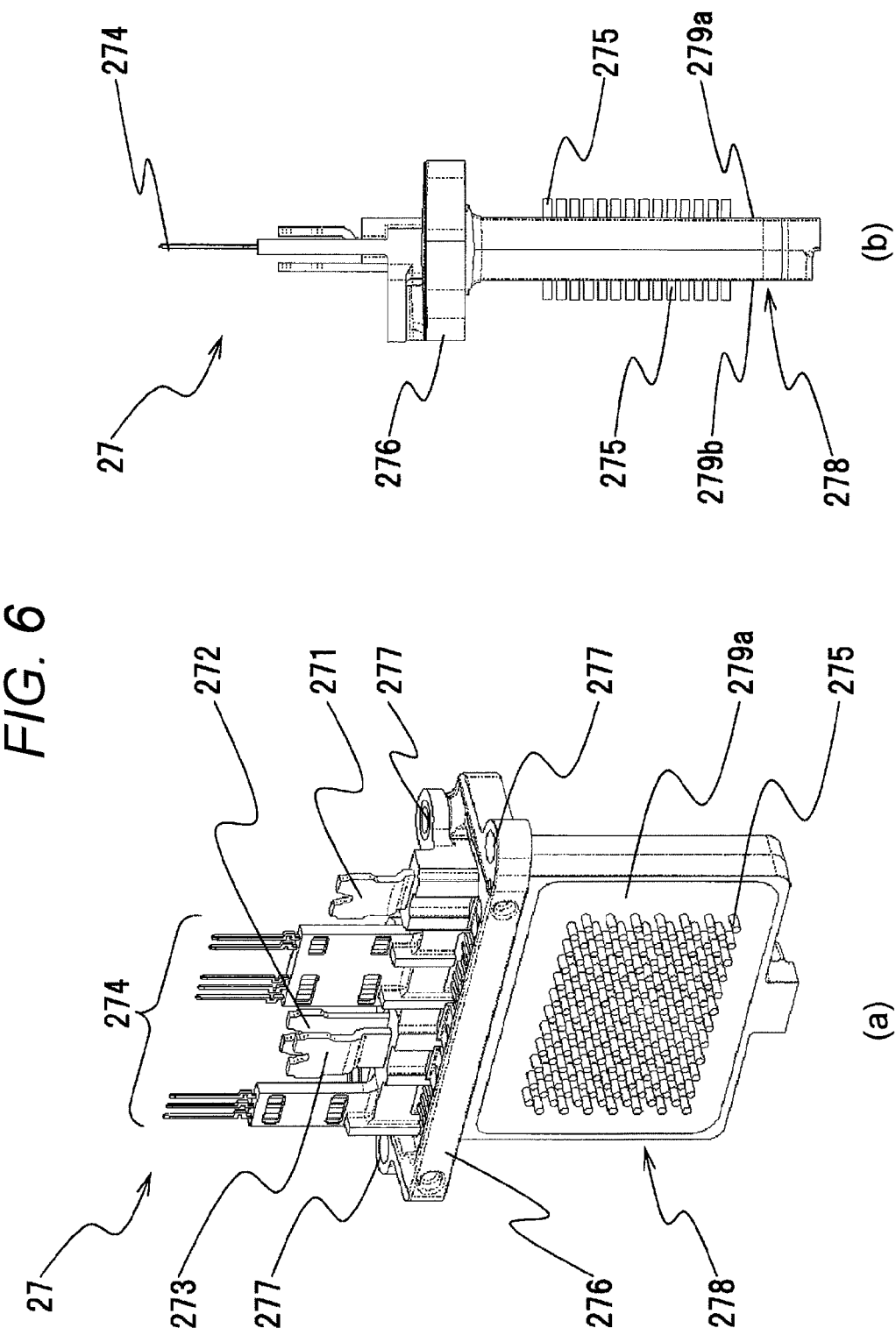
FIGS. 6(a) and 6(b) are an external perspective view and side surface view illustrating a power module according to the first embodiment of the present invention.

As illustrated in FIGS. 6(a) and 6(b), at the end portion, the power module 27 includes: the alternating current terminal 271, a positive-side direct current terminal 272, and a negative-side direct current terminal 273 for the high-current system; and a control terminal 274 for the low-current system (control system).

The power module 27 includes a rectangular parallelepiped shaped module case 278 made of metal material such as aluminum alloy material. The module case 278 has an opening at one end. Switching semiconductor devices such as IGBTs and diodes are inserted from the opening, and are sealed with resin.

The power module 27 is formed with a flange 276 to enclose the periphery of the opening of the module case 278. The flange 276 is formed with fixing bolt holes 277 corresponding to attachment holes which are formed at the side close to the inverter case 20. The power module 27 is fixed to a predetermined position by fastening the flange 276 by bolts.

In the module case 278, the surfaces of the two side plates arranged to face each other are referred to as a first radiation surface 279a and a second radiation surface 279b. On each of the first radiation surface 279a and the second radiation surface 279b, a plurality of pin fins 275 are vertically provided outwardly. The first radiation surface 279a and the second radiation surface 279b on which the pin fins 275 are vertically provided are arranged within the coolant path explained later.

The duty of the switching of the power module 27 is calculated by the control unit of the control circuit board 23 on the basis of commands of a torque and a rotation speed on the side close to the vehicle, which are mainly input from the signal connector 22. A switching command according to the duty is output to the control terminal 274 of the power module 27. Signals are exchanged via signal harness, pins, and the like between the signal connector 22 and the control circuit board 23 and between the control circuit board 23 and the control terminal 274 of the power module 27, which are omitted in the figure.

As illustrated in FIG. 4, at the center of the inverter case 20, bearings 34 are provided to hold the end portions of the shaft of the rotator 7 in a rotatable manner. A resolver 35, which is a rotation speed sensor for the rotator 7, is incorporated into the upper portion of the bearing 34 of the inverter case 20. The resolver 35 includes a resolver rotor (not illustrated) attached to the shaft of the rotator 7 and a resolver stator arranged to face the peripheral side of the resolver rotor with a gap therebetween. The signal from the resolver 35 is transmitted via a signal harness or signal pins (not illustrated) to the control circuit board 23.

[Rotator Holding Unit]

As illustrated in FIGS. 2 to 4, the rotator holding unit 4 is attached to the end portion of the rotating electrical machine 3 which is opposite, in the axial direction, to the side where the power inverter 2 is arranged. The rotator holding unit 4 includes a bearing 34 that rotatably holds the rotator 7 and a ring-shaped rear case 40 that accommodates the bearing 34. The rear case 40 is arranged such that the upper surface thereof is in contact with the lower surface of the stator core 30. That is, the rotator holding unit 4 is stacked on the rotating electrical machine 3 and integrated with the rotating electrical machine 3 in such a manner that the upper surface of the rear case 40 is in contact with the lower surface of the stator 8.

As illustrated in FIG. 4, bearings 34 are provided to hold the end portions of the shaft of the rotator 7 at the center of the rear case 40. A flange 50 is formed, and the rotating electrical machine unit 1 is fixed by fastening, using bolts, the flange 50 to an attachment unit such as a gear case and a transmission of the vehicle.

[Coolant Path]

Figure 7:
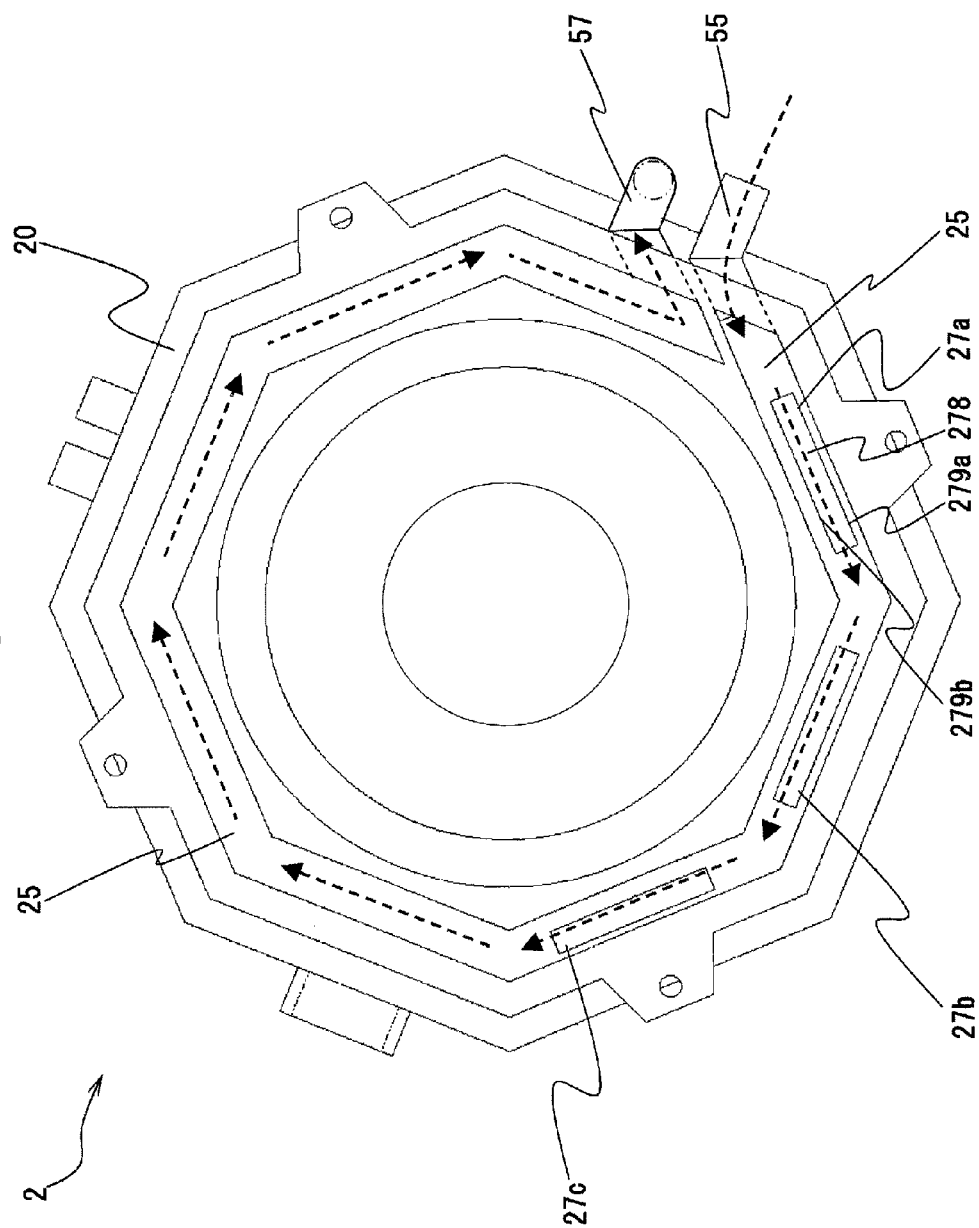
FIG. 7 is a bottom schematic view illustrating flow of a cooling medium in a coolant path in the power inverter according to the first embodiment of the present invention.

The coolant path formed in the inverter case 20 and the rear case 40 will be explained with reference to FIGS. 3, 4, and 7. FIG. 7 is a bottom schematic view illustrating flow of a cooling medium in a coolant path 25 in the power inverter 2.

As illustrated in FIGS. 4 and 7, a coolant path 25 for flowing the cooling medium is formed in the inverter case 20. The coolant path 25 is formed such that the ring-shaped concave space formed from the lower surface of the inverter case 20 is closed by the upper surface of the stator core 30. More specifically, the coolant path 25 is formed to enclose the periphery of the stator coil 32 along the end portion of the stator core 30 (core back). The cross-sectional shape of the coolant path 25 is a rectangular shape, and is provided by three concave surfaces formed in the inverter case 20 and a surface 251 on the upper side of the stator core 30. Incidentally, liquid gasket is applied between the surface 251 of the stator core 30 and the end surface of the inverter case 20 which is in contact with the surface 251, so that the coolant path 25 is sealed.

As illustrated in FIG. 7, a cooling medium inlet pipe 55 for introducing the cooling medium from the cooling system on the side close to the vehicle (not illustrated) is attached to the inverter case 20, and the cooling medium inlet pipe 55 is in communication with the coolant path 25. A communication pipe 57, which is an outlet of the coolant path 25 in the inverter case 20, is attached to the vicinity of the cooling medium inlet pipe 55.

As illustrated in FIGS. 4 and 7, a module case 278 of the power module 27 is inserted into the coolant path 25, and a first radiation surface 279a and a second radiation surface 279b are arranged to face the inner and outer periphery of the coolant path 25 each formed to have a ring shape. Since the first radiation surface 279a and the second radiation surface 279b are arranged along the flow of the cooling medium introduced into the coolant path 25, the pin fins 275 protrude from the first radiation surface 279a and the second radiation surface 279b toward the coolant path 25 in such a manner that the pin fins 275 are perpendicular to the flow of the cooling medium.

As illustrated in FIG. 7, the first power module 27a is arranged in the vicinity of the cooling medium inlet pipe 55 of the inverter case 20. The second power module 27b is arranged along the flow of the cooling medium introduced from the cooling medium inlet pipe 55 at an interval with an angle of 45 degrees from the first power module 27a about the center axis in the axial direction of the rotator 7. The third power module 27c is arranged along the flow of the cooling medium introduced from the cooling medium inlet pipe 55 at an interval with an angle of 45 degrees from the second power module 27b about the center axis in the axial direction of the rotator 7.

Therefore, the cooling medium is introduced from the cooling medium inlet pipe 55 and flows along the stator 8, thereby directly cooling the first to third power modules 27a, 27b, 27c and the stator core 30. The other components of the stator coil 32 and the power inverter 2 are cooled via the stator core 30 and the inverter case 20 which are cooled by the cooling medium. The cooling medium, which has substantially flown around in such a manner as to draw a circle along the stator 8 when seen in planar view, is discharged from the communication pipe 57.

On the other hand, as illustrated in FIGS. 3 and 4, like the inverter case 20, the rear case 40 is also formed with a coolant path 45 which is a ring-shaped in a concave manner along the stator 8 and the upper surface of which is open. The coolant path 45 is formed such that the ring-shaped concave space formed from the upper surface of the rear case 40 is closed by the lower surface of the stator core 30. It should be noted that liquid gasket is applied between the surface 451 at the lower side of the stator core 30 and the end surface of the rear case 40 which is in contact with the surface 451, so that the coolant path 45 is sealed. The other end of the communication pipe 57 attached to the inverter case 20 described above is connected to the coolant path 45 of the rear case 40 (see FIG. 2). That is, the coolant path 25 of the inverter case 20 is in communication with the coolant path 45 of the rear case through the communication pipe 57. A cooling medium outlet pipe 56 which is an outlet of the coolant path 45 of the rear case 40 is attached to the vicinity of the communication pipe 57 (see FIG. 2).

Therefore, the cooling medium, which has passed from the cooling medium inlet pipe 55 to the coolant path 25, passes through the coolant path 25 of the inverter case 20 and flows out of the communication pipe 57 to be introduced into the coolant path 45 of the rear case 40. The cooling medium introduced into the coolant path 45 of the rear case 40 flows along the core back of the stator 8 and directly cools the rear case 40 of the stator core 30. The cooling medium is discharged from the cooling medium outlet pipe 56 and is collected by a cooling system (not illustrated) on the side close to the vehicle.

According to the present embodiment as explained above, the following advantageous effects can be obtained.

(1) The coolant path 25 is formed to have a ring shape along the stator 8 at the end portion of the rotating electrical machine 3 in the axial direction, and the module case 278 of the power module 27 is inserted into the coolant path 25. The module case 278 constitutes a heat radiation unit for radiating heat from the pair of transistors in the upper and lower arm circuits, and the module case 278 exchange heat with the cooling medium flowing in the coolant path 25, and therefore, the power module 27 can be cooled effectively. Further, the cooling medium also cools the stator core 30 to cool the stator coil 32 via the stator core 30.

(2) The power inverter 2 and the rotator holding unit 4 have an external shape corresponding to the external shape of the rotating electrical machine 3, and are attached to both end portions of the rotating electrical machine 3 in the axial direction to sandwich the rotating electrical machine 3. Therefore, the rotating electrical machine unit 1 which is compact but is easily installed on a vehicle can be provided.

(3) The power inverter 2 is attached to one side of the rotating electrical machine 3, and the rotator holding unit 4 is attached to the other side of the rotating electrical machine 3. Since the coolant paths 25, 45 are provided in both of the power inverter 2 and the rotator holding unit 4, the stator core 30 is cooled from the both end portions in the axial direction. Therefore, the stator core 30 and the stator coil 32 can be cooled effectively.

(4) The coolant path 25 of the power inverter 2 is formed such that the ring-shaped concave space formed from the lower surface of the inverter case 20 is closed by the upper surface of the stator 8. The coolant path 45 of the rotator holding unit 4 is formed such that the ring-shaped concave space formed from the upper surface of the rear case 40 is closed by the lower surface of the stator 8. With such a configuration, the cooling medium is directly in contact with the upper side and lower surfaces 251, 451 of the stator core 30, and therefore, the stator core 30 can be cooled effectively.

(5) The coolant paths 25, 45 are formed at the end portions of the stator core 30 in the axial direction, and therefore, the area of the stator core 30 for radiation can be sufficiently ensured, and the stator core 30 can be cooled efficiently. Further, since the coolant paths 25, 45 are formed around the stator coil 32 which is one of heat radiation bodies in the rotating electrical machine 3, the stator coil 32 can be cooled efficiently.

Figure 8:
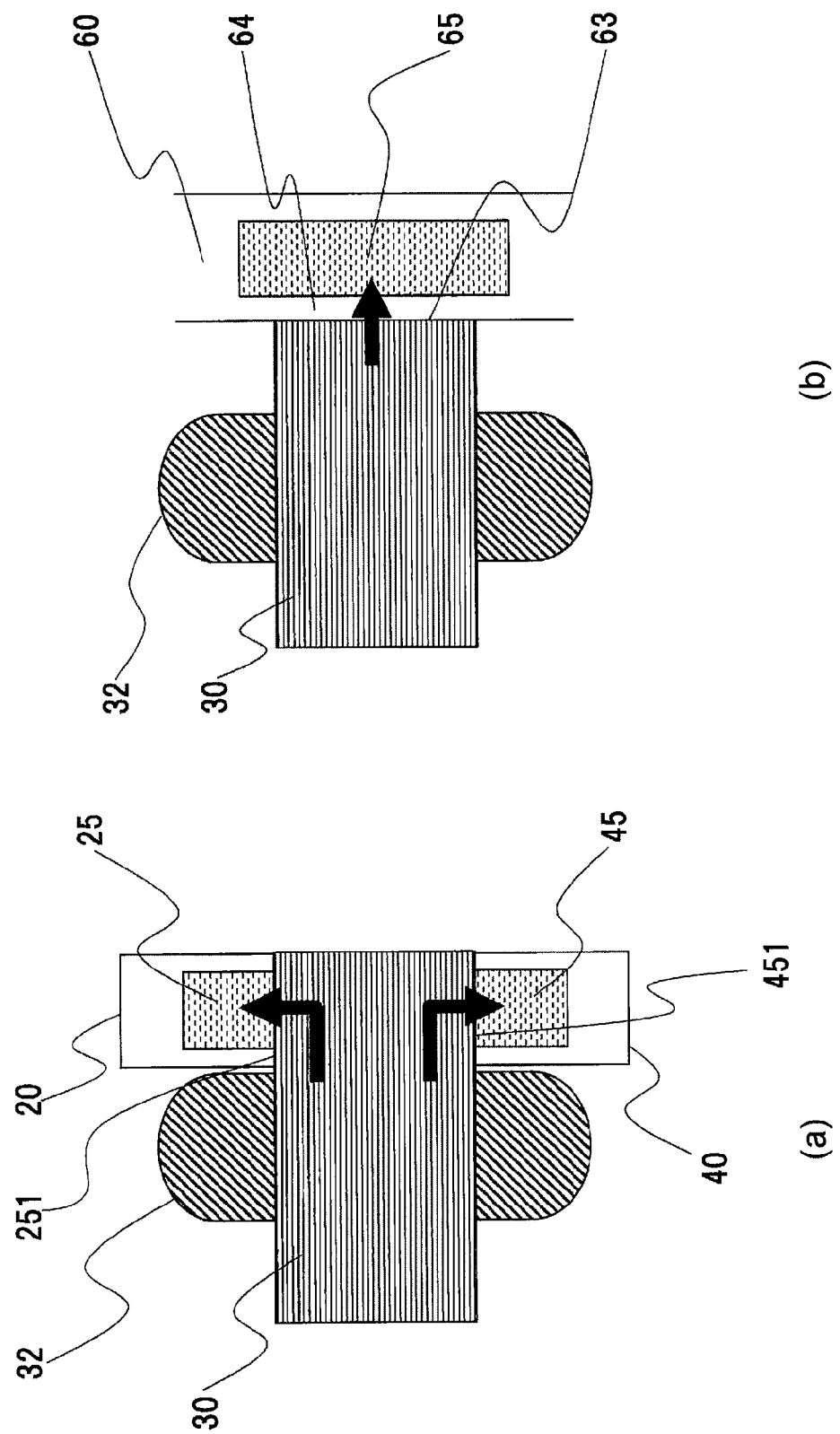
FIGS. 8(a) and 8(b) are schematic views illustrating movement of heat from a stator core.

The advantageous effects caused by the coolant paths 25, 45 formed at the end portions of the stator core 30 in the axial direction will be explained in more detail with reference to FIGS. 8(a) and 8(b). FIG. 8(a) is a schematic view illustrating movement of heat from the stator core 30 according to the first embodiment, and FIG. 8(b) is a schematic view illustrating movement of heat from the stator core 30 when the coolant path 65 is provided at a side of the periphery of the stator core 30. In the figures, the flow of heat is schematically illustrated by arrows.

Conventionally, as illustrated in FIG. 8(b), a coolant path 65 may be formed in a direction along a side surface (outside of the periphery) of the stator core 30. As illustrated in FIG. 8(b), the stator core 30 provided by stacking several hundred of thin silicon steel plates in the axial direction is fixed to a housing 60 made of metal such as aluminum by shrink fit or press fit. In the housing 60, the coolant path 65 is formed along the periphery of the stator core 30.

With such a configuration, the heat of the stator coil 32 is transmitted to the housing 60 via the stator core 30, and is radiated to the coolant path 65. The heat passes the interface 63 of the housing 60 and the stator core 30, but at this interface 63, the external periphery of each stacked thin steel plate is in line contact with the inner periphery of the housing 60.

Layers of air are formed between steel plates constituting the stator core 30 of the interface 63 to become thermal resistance which prevents cooling. Further, the inner wall 64 of the housing 60 interposed between the coolant path 65 and the stator core 30 also serves as thermal resistance.

In contrast, as illustrated in FIG. 8(a), in the rotating electrical machine unit 1 according to the first embodiment, the coolant paths 25, 45 are formed at the end portions of the rotating electrical machine 3 in the axial direction, and the end surface of the stator core 30 can be brought into surface contact with the cooling medium. Thus, the area for radiation can be sufficiently ensured. Further, the cooling medium can be brought into direct contact with the stator core 30, and the coolant paths 25, 45 can be formed in the vicinity of the stator coil 32. Thus, the cooling performance can be improved.

(6) As illustrated in FIG. 7, the cooling medium inlet pipe 55 is arranged in the vicinity of the power module 27, and therefore, the power module 27 can be cooled using the cooling medium of the lowest temperature. Therefore, the power module 27 can be cooled efficiently.

(7) The size (product thickness) of the stator core 30 in the axial direction can be increased or decreased with the pitch of the plate thickness of the silicon steel plate as necessary. That is, such a structure can be easily applied to another application having the same external shape but having a different product thickness by changing only the number of stacked silicon steel plates without requiring modification of the mold of the stator core 30.

(8) The ribs 201, 301, 401 are arranged at an interval of 90 degrees in the circumferential direction, and therefore, can be produced by rotating and stacking the stator core 30 with a pitch of 90 degrees. Thus, the rotating electrical machine unit 1 having the stator core 30 with a high degree of accuracy of shape can be provided. The term "rotating and stacking" means a method for producing the stator core 30 by successively arranging the plurality of stacked bodies each made of a predetermined number of thin steel plates at a predetermined angle in the circumferential direction, so as to equalize the deviation of the plate thickness.

(9) The rotating electrical machine 3 is, for example, a 12-pole motor of which number of slots 305 is 72, is provided with four ribs 301. That is, an integral multiplication of the number of ribs 301 is the same as the number of poles of the rotating electrical machine 3. Thus, the stator shape equally balanced in the rotation direction is provided, and the distribution of magnetic field does not become irregular. It is possible to prevent increase of undesired torque pulsation and noise which may be caused by the irregular distribution.

(10) Since the rotating electrical machine 3 and the power inverter 2 are integrated, a cable can be omitted as compared with a rotating electrical machine unit in which the rotating electrical machine and the power inverter are arranged separately. Therefore, the weight of the rotating electrical machine unit 1 can be reduced, and the noise can be also reduced.

Second Embodiment

Figure 9:
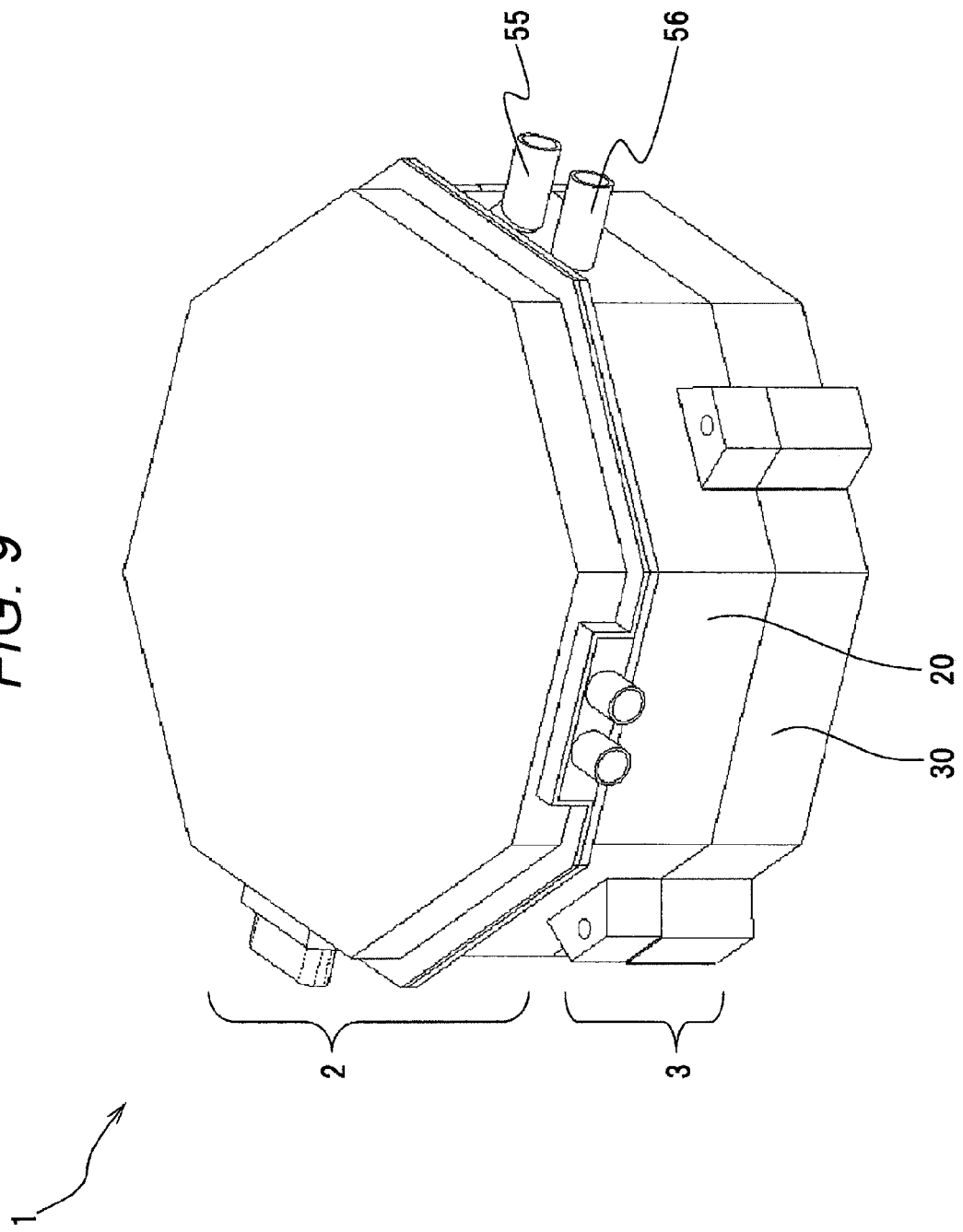
FIG. 9 is an external perspective view illustrating a rotating electrical machine unit according to the second embodiment of the present invention.

A rotating electrical machine unit 1 according to a second embodiment will be explained with reference to FIG. 9. In the figure, the same or corresponding portions as those of the first embodiment will be denoted with the same reference numerals, and description thereof is omitted. FIG. 9 is an external perspective view illustrating the rotating electrical machine unit 1 according to the second embodiment of the present invention. In the second embodiment, bearings for rotatably holding the rotator are provided in a gear case, a transmission, or the like. In the rotating electrical machine unit 1, the rotator holding unit 4 is omitted. In the second embodiment, instead of the communication pipe 57 described above, a cooling medium outlet pipe 56 is attached to the power inverter 2.

The cooling medium entered from the cooling medium inlet pipe 55 circulates the coolant path 25 of the inverter case 20 formed in the same manner as the first embodiment, and is discharged from the cooling medium outlet pipe 56. That is, the stator core 30 is cooled by the cooling medium which is directly brought into contact with one of the surfaces.

According to the second embodiment, by omitting the rotator holding unit 4 explained in the first embodiment, the rotating electrical machine unit 1 which is smaller can be provided.

Third Embodiment

Figure 10:
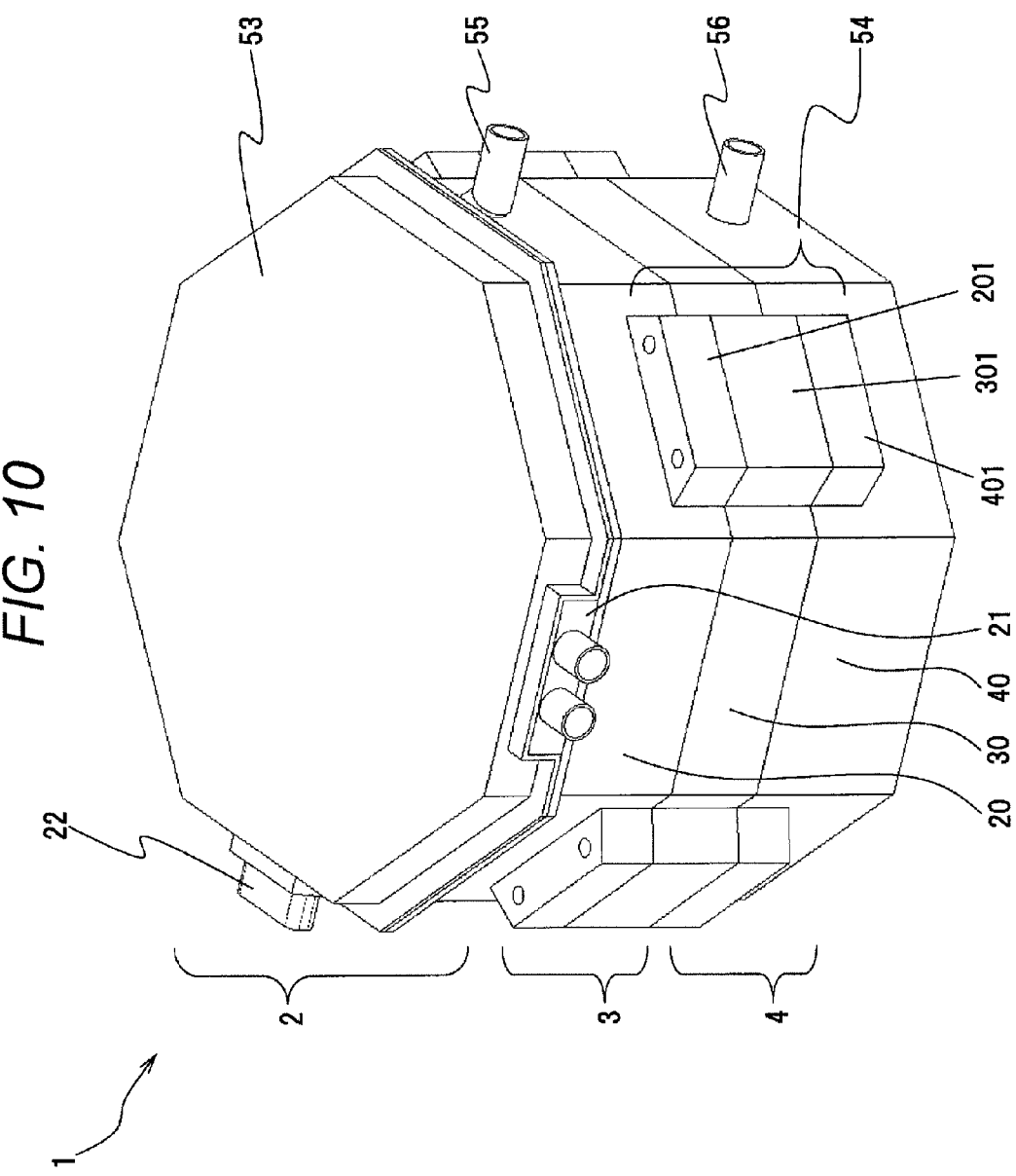
FIG. 10 is an external perspective view illustrating a rotating electrical machine unit according to a third embodiment of the present invention.
Figure 11:
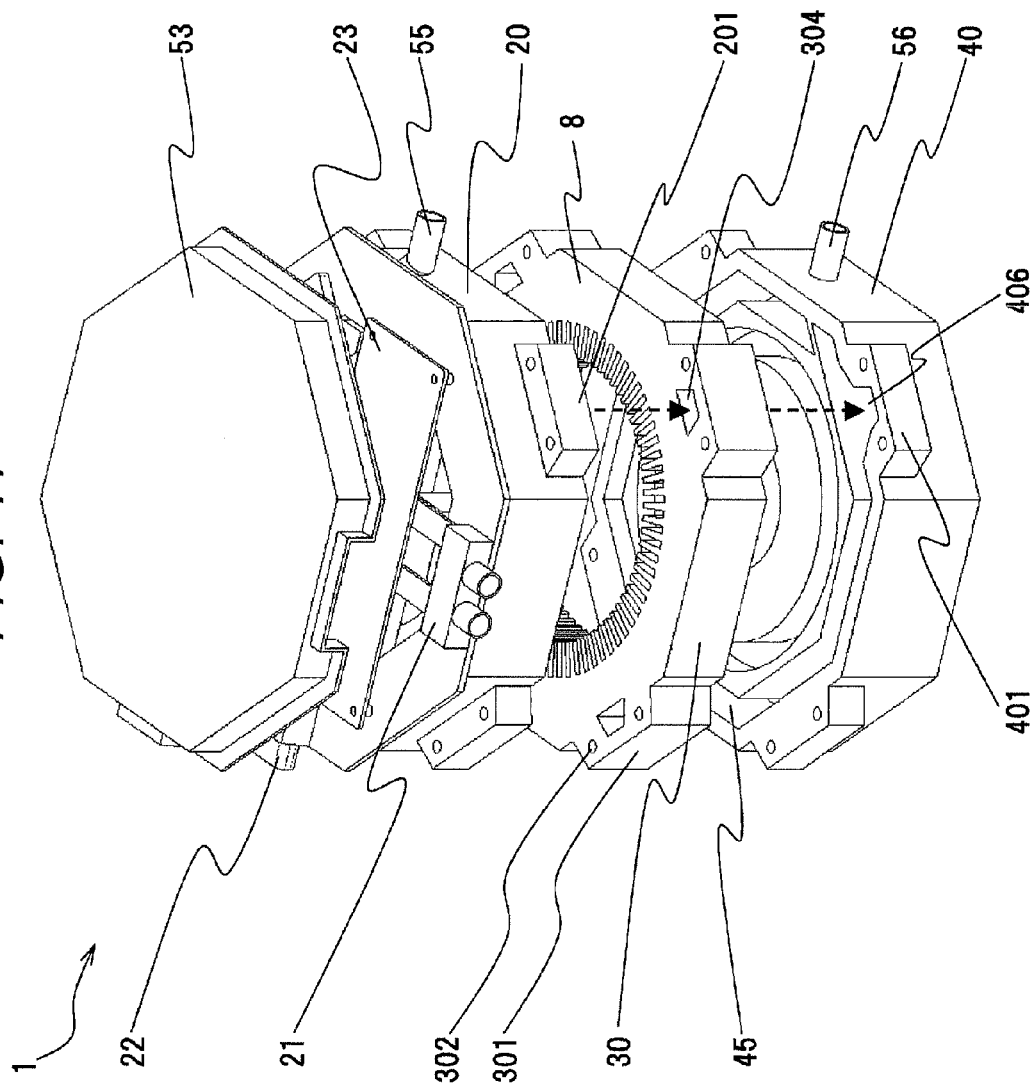
FIG. 11 is an exploded perspective view illustrating a rotating electrical machine unit according to the third embodiment of the present invention.
Figure 12:
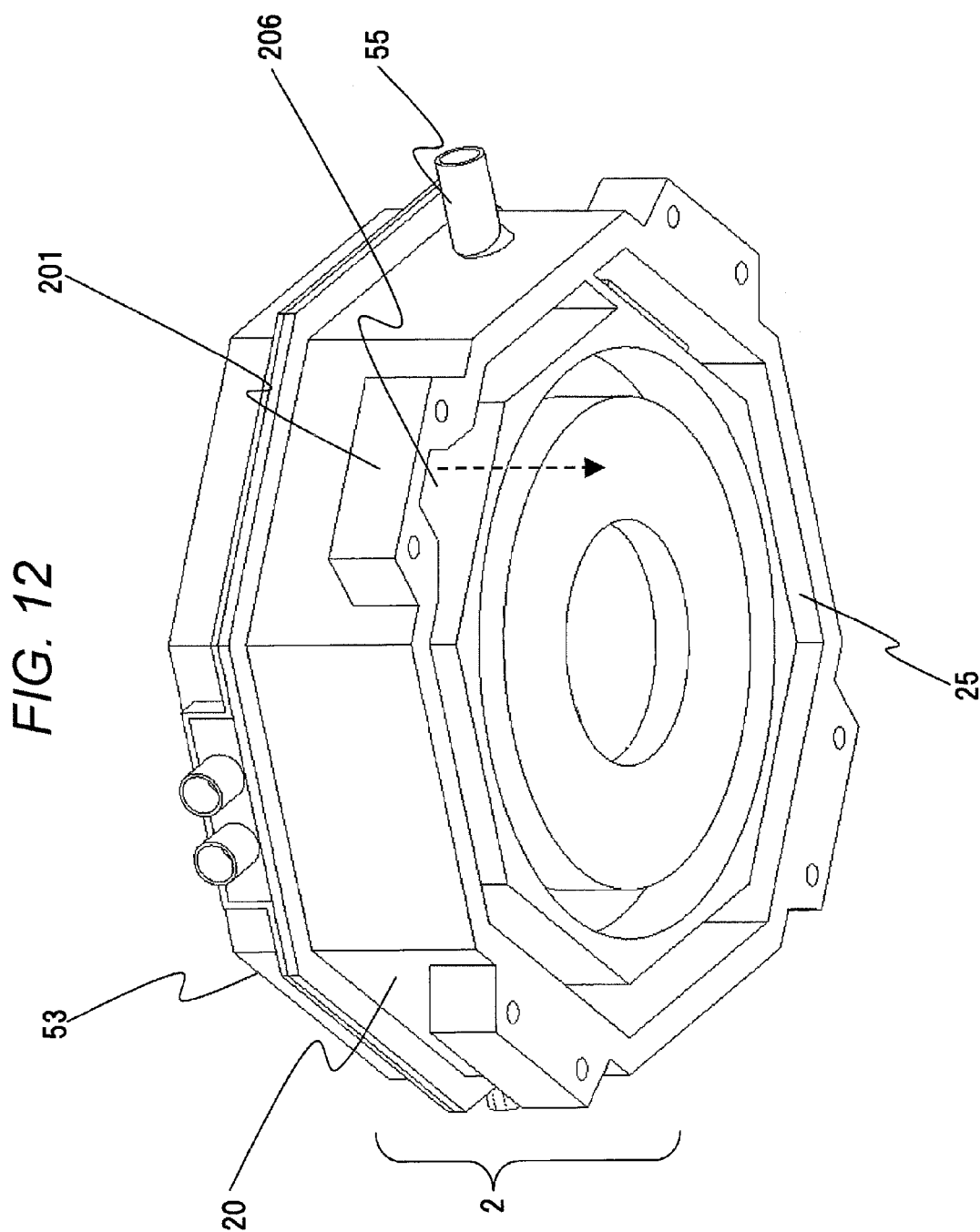
FIG. 12 is a perspective view illustrating an inverter case of the rotating electrical machine unit according to the third embodiment of the present invention.
Figure 13:
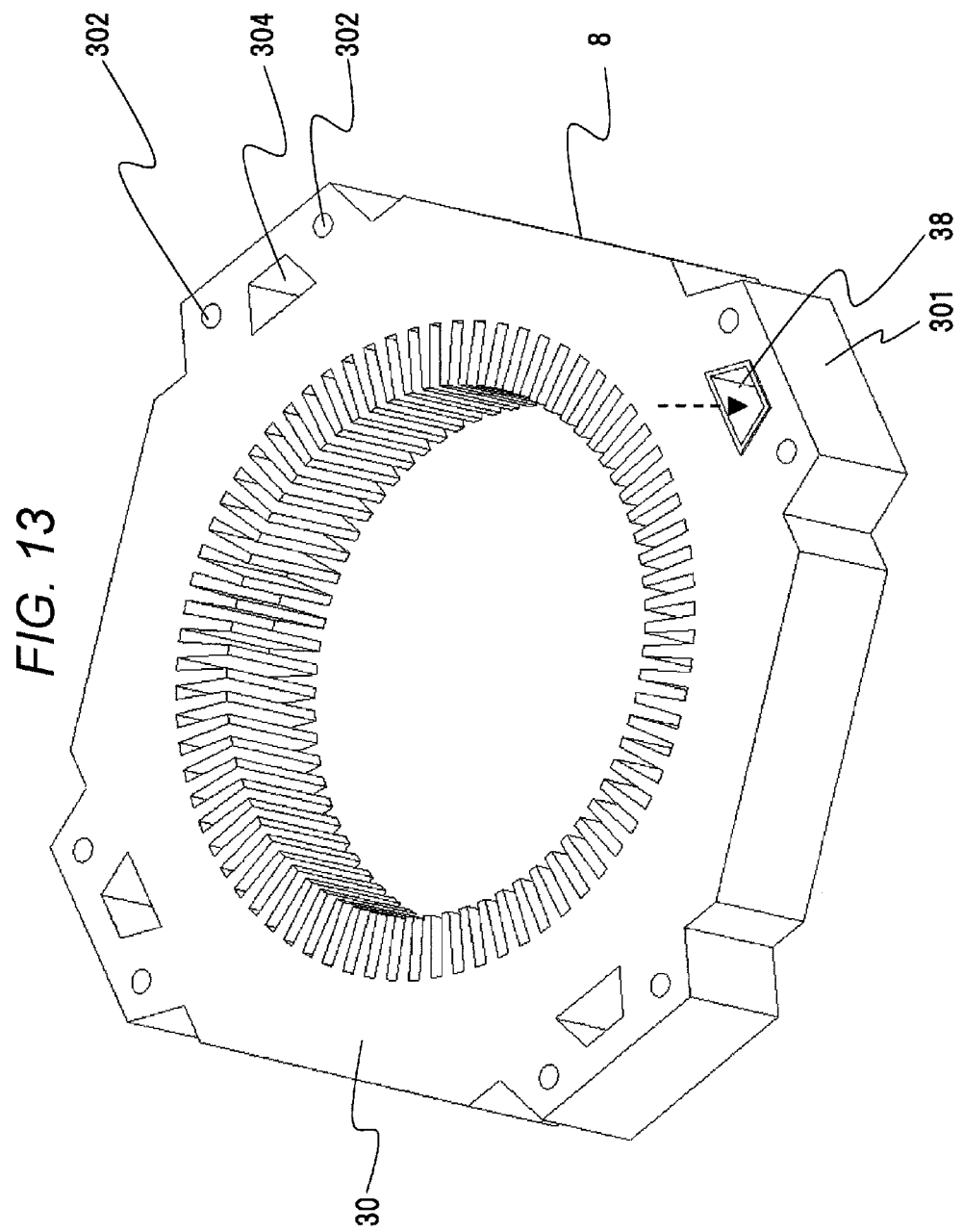
FIG. 13 is a perspective view illustrating a stator core of the rotating electrical machine unit according to the third embodiment of the present invention.
Figure 14:
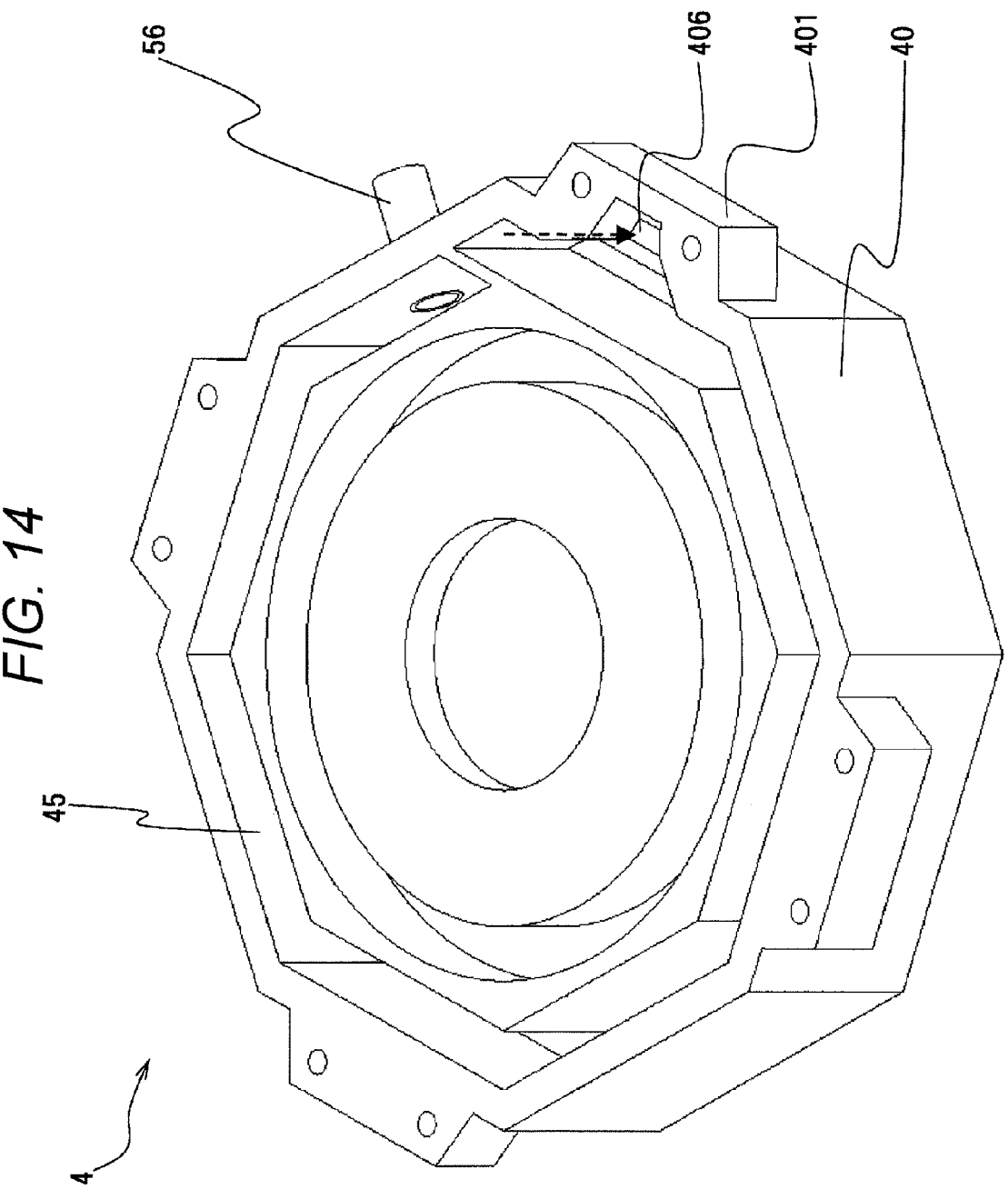
FIG. 14 is a perspective view illustrating a rear case of the rotating electrical machine unit according to the third embodiment of the present invention.
Figure 15:
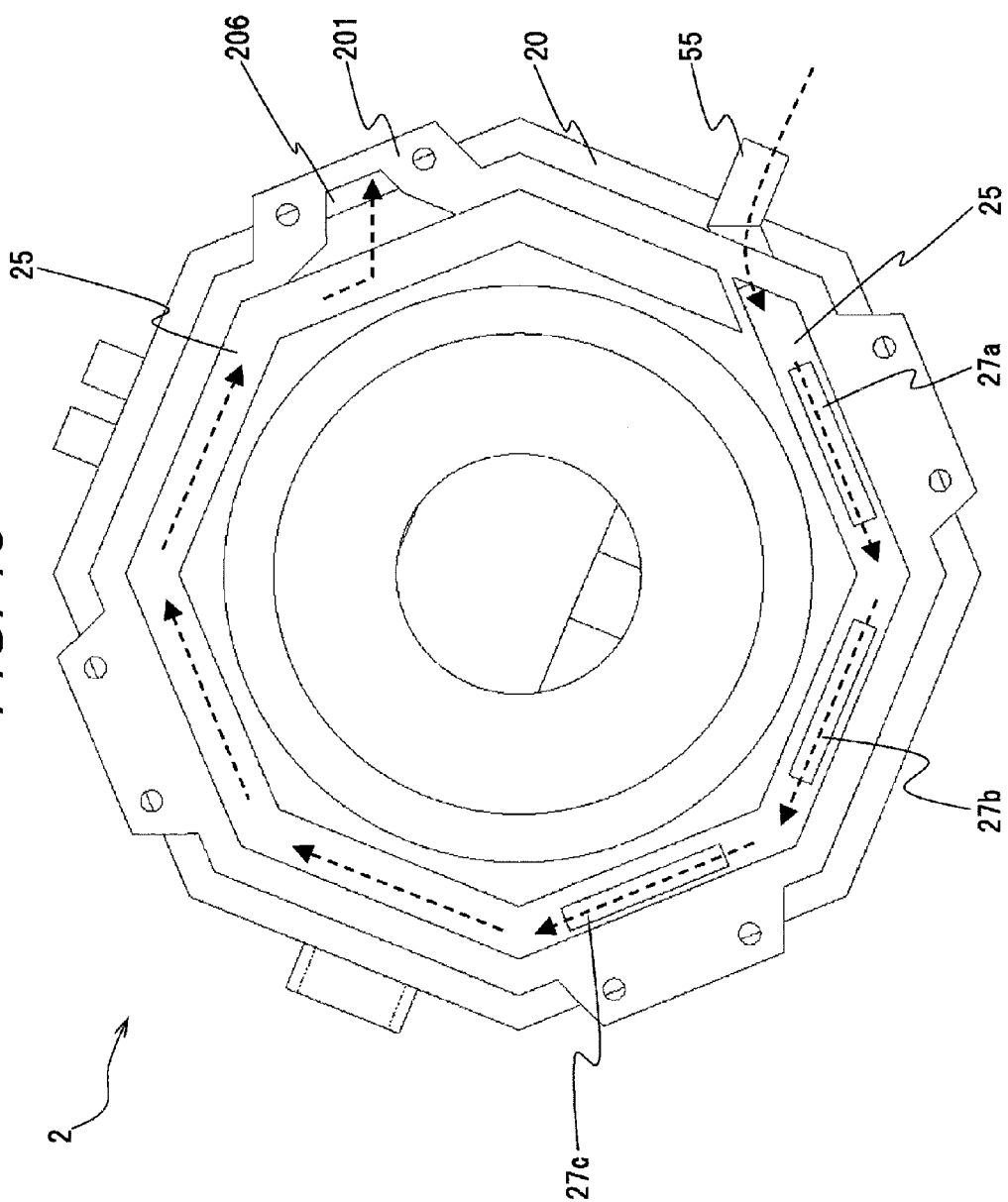
FIG. 15 is a bottom schematic view illustrating flow of a cooling medium in a coolant path in a power inverter of the rotating electrical machine unit according to the third embodiment of the present invention.

A rotating electrical machine unit 1 according to a third embodiment will be explained with reference to FIGS. 10 to 15. In the figure, the same or corresponding portions as those of the first embodiment will be denoted with the same reference numerals, and description thereof is omitted. FIG. 10 is an external perspective view illustrating the rotating electrical machine unit 1 according to the third embodiment. FIG. 11 is an exploded perspective view illustrating the rotating electrical machine unit 1. FIGS. 12, 13, and 14 are perspective views illustrating an inverter case 20, a stator core 30, and a rear case 40. FIG. 15 is a bottom schematic view illustrating flow of a cooling medium in a coolant path 25 of a power inverter 2 of the rotating electrical machine unit 1. In each of FIGS. 11 to 15, the flow of the cooling medium is schematically illustrated by arrows of broken lines.

As illustrated in FIGS. 11 and 13, in the third embodiment, instead of the communication pipe 57 explained in the first embodiment, a penetrating hole 304 serving as a communication flow channel allowing communication between the coolant path 25 of the power inverter 2 and the coolant path 45 of the rotator holding unit 4 is provided in the rib 301 of the stator core 30.

As illustrated in FIG. 10, in the third embodiment, a wide rib group 54 is provided as compared with the first and second embodiments. Two bolt holes are provided in the rib group 54. As illustrated in FIG. 13, the rib 301 of the stator core 30 extends from the stator core 30 to the outer side in the diameter direction. The penetrating hole 304 is formed at the center of the rib 301, and one bolt hole 302 is formed at each side of the penetrating hole 304 (totally two bolt holes 302 are formed in each rib 301).

The rib 301 of the stator core 30 is arranged at an interval of 90 degrees in the circumferential direction, and all of the four ribs 301 have the same structure. At least one of the penetrating holes 304 functions as the communication flow channel for passing the cooling medium, instead of the communication pipe 57 of the first embodiment.

Since the penetrating holes 304 and the bolt holes 302 are provided in all of the four ribs 301, the stator core 30 can rotated and stacked.

As illustrated in FIG. 13, a flow channel cover 38 made of rubber, plastic, and the like is fixed to the penetrating hole 304 passing the cooling medium to prevent the cooling medium from immersion through the gaps between the stacked steel plates. Accordingly, when water and antifreeze liquid are used as the cooling medium, the rust of the stator core 30 is prevented. It should be noted that the rib group 54 is fastened by the bolts inserted to the both sides of the penetrating hole 304, and accordingly, the sealing of the penetrating hole 304 passing the cooling medium is ensured.

As illustrated in FIGS. 10 and 11, the rib 201 of the inverter case 20 and the rib 401 of the rear case 40 are formed in accordance with the shape of the rib 301 of the stator core 30. As illustrated in FIGS. 12 and 15, a dent 206 corresponding to the penetrating hole 304 of the rib 301 of the rotating electrical machine 3 is formed in the rib 201 in the vicinity of the end portion of the coolant path 25 of the inverter case 20. The dent 206 is opened on the side close to the rotating electrical machine 3 and on the side close to the coolant path 25 (inner wall), and is in communication with the penetrating hole 304 of and the stator core 30 and the coolant path 25.

Likewise, as illustrated in FIG. 14, a dent 406 corresponding to the penetrating hole 304 of the rib 301 in the rotating electrical machine 3 is formed in one of the ribs 401 of the rear case 40. The dent 406 is opened on the side close to the rotating electrical machine 3 and on the side close to the dent 406 facing the coolant path 25 (inner wall) are open, and is in communication with the penetrating hole 304 of the stator core 30 and the coolant path 45.

As illustrated in FIG. 11, the dent 206 of the rib 201 of the inverter case 20 (see FIG. 12) and the dent 406 of the rib 401 of the rear case 40 are arranged to be in parallel with the axial direction of the rotating electrical machine 3. As described above, the dent 206 is in communication with the coolant path 25 of the inverter case 20 (see FIG. 12), and the dent 406 is in communication with the coolant path 45 of the rear case 40 (see FIG. 14).

As illustrated in FIG. 15, the cooling medium in the rotating electrical machine unit 1 according to the third embodiment is introduced from the cooling medium inlet pipe 55 to the coolant path 25 of the power inverter 2 to flow along the stator as if it draws a circle when seen in planar view. As illustrated in FIGS. 11, 12, and 15, the cooling medium having almost made the circle flows from the dent 206 of the rib 201 into the penetrating hole 304.

The cooling medium introduced from the penetrating hole 304 removes heat from the stator core 30, and, as illustrated in FIGS. 11 and 14, the cooling medium flows to the dent 406 of the rib 401 of the rear case 40 to be introduced into the coolant path 45. The cooling medium introduced to the coolant path 45 of the rear case 40 flows along the stator 8 and moves around the coolant path 45. The cooling medium is then returned back from the cooling medium outlet pipe 56 to cooling system of the vehicle.

In the rotating electrical machine unit 1 according to the third embodiment, the penetrating hole 304 serving as a communication flow channel allowing communication between the coolant path 25 of the power inverter 2 and the coolant path 45 of the rotator holding unit 4 is provided in the stator core 30. The stator 8 can be cooled not only by the upper surface and the lower surface of the stator core 30 but also by the cooling medium passing through the penetrating hole 304, and therefore, the cooling performance can be improved. When a part of the outer diameter of the stator core 30 is enlarged, the magnetic resistance is reduced and the electric performance of the rotating electrical machine 3 is improved.

The following modifications are also within the scope of the present invention, and one or multiple modifications may be combined with the embodiments explained above.

[Modifications]

(1) In the embodiments explained above, three power modules 27a, 27b, 27c of 2-in-1 package are employed, but the invention is not limited thereto. As necessary, six power modules of 1-in-1 package may be used, or one power module of 6-in-1 package may be used.

(2) In the embodiments explained above, the IGBTs are employed as the switching semiconductor devices. However, depending on the required frequency and voltage, other semiconductor devices such as metal-oxide-semiconductor field-effect transistors (MOSFETs) may be employed. An IGBT is suitable as the switching semiconductor device when the direct current voltage is relatively high, and a MOSFET is suitable as the switching semiconductor device when the direct current voltage is relatively low.

(3) The numbers of through bolts and ribs for integrating the power inverter 2, the rotating electrical machine 3, and the rotator holding unit 4 may be increased or decreased as necessary.

(4) The power inverter 2, the rotating electrical machine 3, and the rotator holding unit 4 are fastened by the bolts to be integrated, but the invention is not limited thereto. Alternatively, the power inverter 2, the rotating electrical machine 3, and the rotator holding unit 4 may be integrated by methods such as welding and adhesion using adhesive agent.

(5) The lead wire 33 (see FIG. 4) is used to extend a part of the stator coil 32, but the invention is not limited thereto. Alternatively, a member corresponding to the lead wire 33 may be connected to the stator coil 32.

(6) Control not relying on any resolver (sensor-less control) may be employed. When no resolver is used, the resolver 35 may be omitted.

(7) Without any harness, the signal connector 22 may be directly attached to the upper portion of the control circuit board 23.

(8) The power module 27 may be an IPM having a gate driving circuit therein, or a generally-available IGBT may be used to provide a gate driving circuit on a circuit board.

(9) When the rotating electrical machine unit 1 is attached to the gear case, the transmission, and the like, an area inside of the stator core 30 (rotator side) may be cooled at the same time using cooling oil of the transmission and the like. In the rotating electrical machine unit 1 according to the second embodiment, the stator 8 may be cooled by directly blowing the cooling oil of the transmission from the opening portion at the center of the bearing for holding the rotator arranged in the transmission to the stator core 30 from the side opposite to the side where the power inverter 2 is arranged.

(10) The direction of the flow of the cooling medium is not limited to the above embodiments. The direction may be opposite to the direction of the above embodiments.

(11) The surfaces 251, 451 of the stator core 30 and the contact surface of the inverter case 20 or the rear case 40 are sealed with liquid gasket, but the invention is not limited thereto. The coolant paths 25, 45 may be sealed using an O ring or the like.

Figure 16:
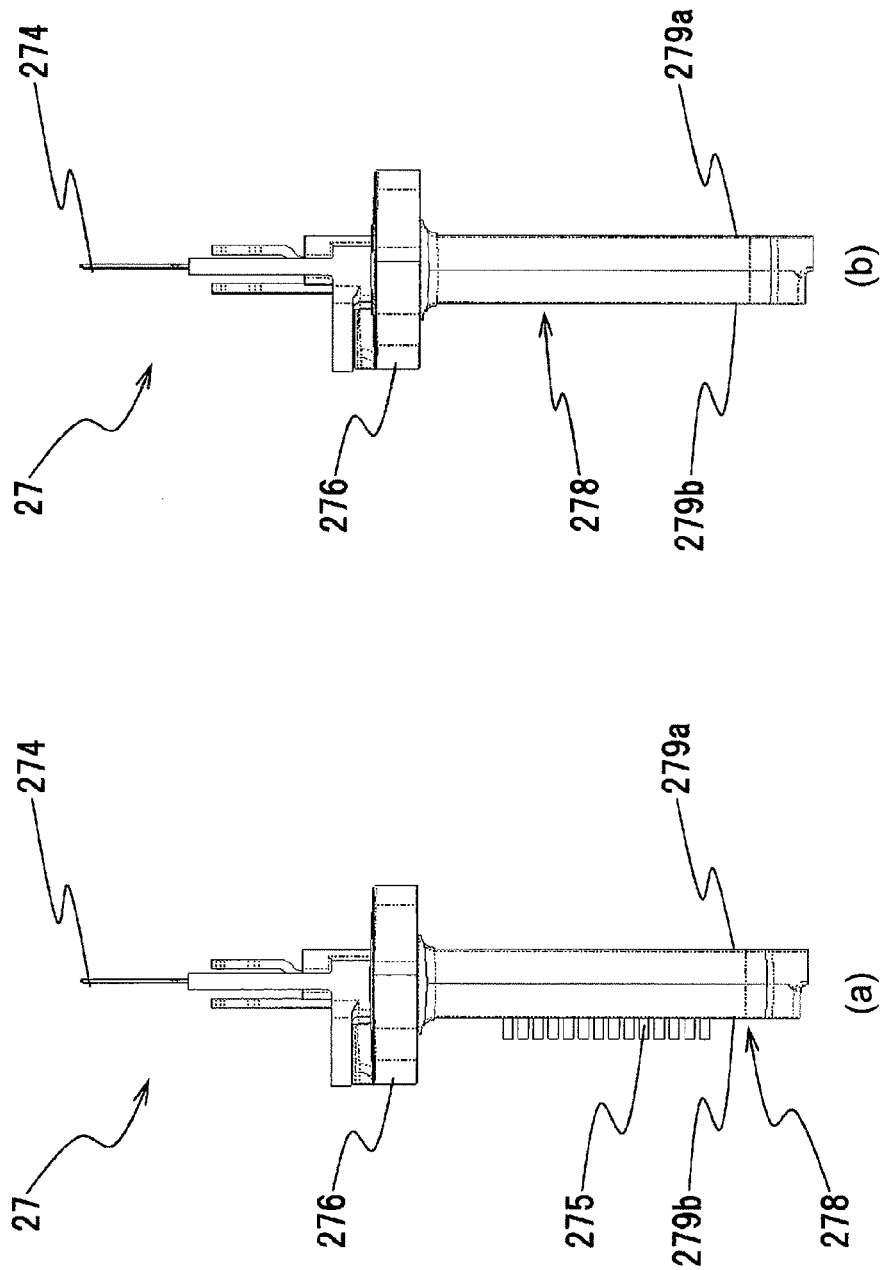
FIGS. 16(a) and 16(b) are side surface views illustrating a power module according to a modification of the present invention.

(12) The pin fins 275 are provided on both sides of the module case 278, but the invention is not limited thereto. As illustrated in FIG. 16(a), the pin fins 275 may be provided on only one surface of the module case 278, or as illustrated in FIG. 16(b), the surface of the module case 278 may be used as a heat radiation unit without providing the pin fins 275. The invention is not limited to the arrangement where both sides of the first and second radiation surfaces 279a, 279b (see FIG. 4) are arranged in the coolant path 25. Alternatively, a heat radiation fin may be arranged on only one surface, and only one surface may be arranged in the coolant path 25.

Figure 17:
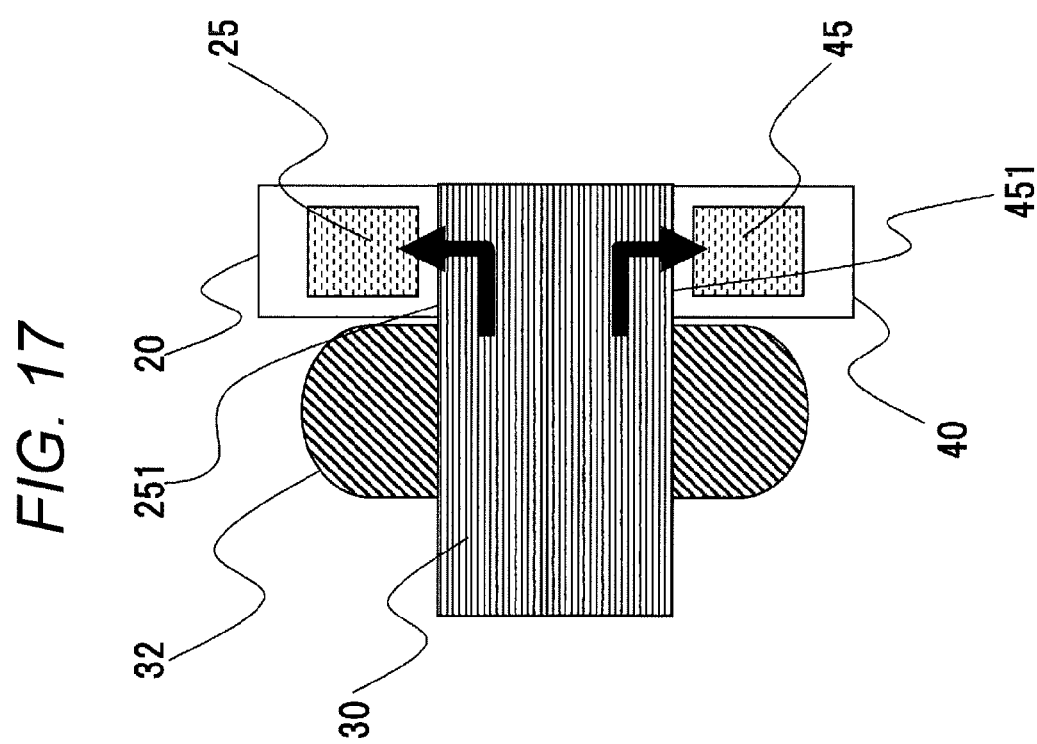
FIG. 17 is a schematic view illustrating a coolant path of a rear case, an inverter case, and a stator core of a rotating electrical machine unit according to the modification of the present invention.

(13) The invention is not limited to the configuration where the cooling medium is brought into direct contact with the surfaces 251, 451 of the stator core 30, i.e., part of the coolant paths 25, 45 is constituted by the surfaces of the stator. Depending on the cooling performance and the temperature of the cooling medium, a metal member with a high degree of thermal conduction may be interposed between the coolant paths 25, 45 and the surface of the stator core 30. For example, as illustrated in FIG. 17, the ring-shaped closed space may be formed in the inverter case 20 to provide a coolant path 25, and the ring-shaped closed space may be formed in the rear case 40 to provide a coolant path 45. Accordingly, while ensuring the waterproof property, the surfaces 251, 451 of the stator core 30 can be cooled.

(14) Instead of the pin fins 275 provided on the module case 278, the fins having various kinds of shapes such as flat plate fins may be provided. The number of fins and the shape of the fin may be determined depending on cooling performance and pressure loss required.

(15) The flange 50 for attachment to the vehicle may not be provided on the rotator holding unit 4, and the rotating electrical machine unit 1 may be fixed to the vehicle using through bolts for fastening the power inverter 2 to the rotating electrical machine 3.

(16) In the second embodiment, the rear case 40 is omitted. Alternatively, without omitting the rear case 40, only the coolant path 45 of the rear case 40 may be omitted. Since the communication pipe 57 is omitted and the length in the axial direction is reduced as compared with the rotating electrical machine unit 1 of the first embodiment, the compact rotating electrical machine unit 1 can be provided.

(17) In the third embodiment, the flow channel cover 38 may be integrally formed, or may be made with multiple plastic plates.

(18) Instead of the flow channel cover 38, a seal material may be applied to the wall surface of the penetrating hole 304. The flow channel cover 38 may be formed of metal plate having a high degree of thermal conduction such as titanium plate.

(19) The relay circuit 80 may be provided in the inverter case 20 as part of the power inverter 2.

(20) The invention is not limited to the case where the interval between the first power module 27a and the second power module 27b and the interval between the second power module 27b and the third power module 27c are 45 degrees. The power modules 27 may be arranged at an interval of predetermined angles such as 30 degrees and 60 degrees.

(21) The cross-sectional shapes of the coolant paths 25, 45 are not limited to the rectangular shapes.

In the above description, various embodiments and modifications have been explained, but the present invention is not limited thereto. Other modes, which can be derived within the technical concept of the present invention, are also included within the scope of the present invention.

The contents disclosed in the following priority application are incorporated herein by reference.

Japanese Patent Application No. 2011-3873 (filed on Jan. 12, 2011)

The invention claimed is:

1. A rotating electrical machine unit comprising:
a rotating electrical machine including a ring-shaped stator and a rotator provided inside of the stator; and
a power inverter including a ring-shaped first casing and a power module accommodated in the first casing, and integrated with the rotating electrical machine by being stacked in such a manner that a lower surface of the first casing is in contact with an upper surface of a stator core of the stator in an axial direction,
wherein the power inverter has a first coolant path formed to have a ring shape in the first casing,
wherein the power module has a heat radiation unit arranged in the first coolant path and exchanging heat with a cooling medium flowing in the first coolant path,
wherein the first coolant path is formed in such a manner that a first space concavely formed to have a ring shape from the lower surface of the first casing is closed by the upper surface of the stator core, and
wherein the cooling medium is water.

2. The rotating electrical machine unit according to claim 1, wherein the rotating electrical machine is an alternating current rotating electrical machine driven by a three-phase alternating current power, and includes an inverter circuit for converting a direct current power into an alternating current power, and
the inverter circuit has first to third power modules provided for each phase,
the first to third power modules are provided by connecting a pair of transistors of upper and lower arm circuits in series,
the heat radiation unit has first and second radiation surfaces radiating heat from the pair of transistors, and
the heat radiation unit is configured such that each of the first and second radiation surface is inserted into the first coolant path to face inner and outer peripheries of the first coolant path formed in the ring shape.

3. The rotating electrical machine unit according to claim 2, wherein, on the first and second radiation surfaces of the heat radiation unit of the first to third power modules, a plurality of heat radiation fins are vertically provided to protrude to the coolant path.

4. The rotating electrical machine unit according to claim 3, wherein each of the first to third power modules has a metal case having a rectangular parallelepiped shape, and surfaces of two side plates arranged to face each other in the metal case having the rectangular parallelepiped shape are the first and second radiation surfaces, respectively.

5. The rotating electrical machine unit according to claim 3, wherein the first power module is arranged near an inlet of the coolant path of the power inverter, and the second power module is arranged at an interval of a predetermined angle from the first power module around a center axis in an axial direction of the rotator along flow of the cooling medium introduced from the inlet of the coolant path, and the third power module is arranged at an interval of a predetermined angle from the second power module around a center axis in the axial direction of the rotator along the flow of the cooling medium.

6. The rotating electrical machine unit according to claim 3 further comprising:
a bearing that rotatably holds the ring-shaped second casing and the rotator; and
a rotator holding unit integrally formed with the rotating electrical machine by being stacked in such a manner that the lower surface of the stator is in contact with the upper surface of the second casing.

7. The rotating electrical machine unit according to claim 2, wherein each of the first to third power modules has a metal case having a rectangular parallelepiped shape, and
surfaces of two side plates arranged to face each other in the metal case having the rectangular parallelepiped shape are the first and second radiation surfaces, respectively.

8. The rotating electrical machine unit according to claim 7, wherein the first power module is arranged near an inlet of the coolant path of the power inverter, and the second power module is arranged at an interval of a predetermined angle from the first power module around a center axis in an axial direction of the rotator along flow of the cooling medium introduced from the inlet of the coolant path, and the third power module is arranged at an interval of a predetermined angle from the second power module around a center axis in the axial direction of the rotator along the flow of the cooling medium.

9. The rotating electrical machine unit according to claim 7 further comprising:
a bearing that rotatably holds the ring-shaped second casing and the rotator; and
a rotator holding unit integrally formed with the rotating electrical machine by being stacked in such a manner that the lower surface of the stator is in contact with the upper surface of the second casing.

10. The rotating electrical machine unit according to claim 2, wherein the first power module is arranged near an inlet of the coolant path of the power inverter, and the second power module is arranged at an interval of a predetermined angle from the first power module around a center axis in an axial direction of the rotator along flow of the cooling medium introduced from the inlet of the coolant path, and the third power module is arranged at an interval of a predetermined angle from the second power module around a center axis in the axial direction of the rotator along the flow of the cooling medium.

11. The rotating electrical machine unit according to claim 10 further comprising:
a bearing that rotatably holds the ring-shaped second casing and the rotator; and
a rotator holding unit integrally formed with the rotating electrical machine by being stacked in such a manner that the lower surface of the stator is in contact with the upper surface of the second casing.

12. The rotating electrical machine unit according to claim 2 further comprising:
   a bearing that rotatably holds the ring-shaped second casing and the rotator; and
   a rotator holding unit integrally formed with the rotating electrical machine by being stacked in such a manner that the lower surface of the stator is in contact with the upper surface of the second casing.

13. The rotating electrical machine unit according to claim 1 further comprising:
   a bearing that rotatably holds the ring-shaped second casing and the rotator; and
   a rotator holding unit integrally formed with the rotating electrical machine by being stacked in such a manner that the lower surface of the stator is in contact with the upper surface of the second casing.

14. The rotating electrical machine unit according to claim 13, wherein the rotator holding unit includes a second coolant path formed to have a ring shape in the second casing.

15. The rotating electrical machine unit according to claim 14, wherein the second coolant path is formed in such a manner that a second space concavely formed to have a ring shape from the upper surface of the second casing is closed by the lower surface of the stator.

16. The rotating electrical machine unit according to claim 15, wherein the stator includes a rib extending to an outer side, and a penetrating hole allowing communication between the first coolant path of the power inverter and the second coolant path of the rotator holding unit is provided as a communication flow channel in the rib.

17. The rotating electrical machine unit according to claim 14, wherein the stator includes a rib extending to an outer side, and a penetrating hole allowing communication between the first coolant path of the power inverter and the second coolant path of the rotator holding unit is provided as a communication flow channel in the rib.

* * * * *